(12) United States Patent
Hirako et al.

(10) Patent No.: US 8,971,870 B2
(45) Date of Patent: Mar. 3, 2015

(54) MOBILE TERMINAL DEVICE, AND CONTROL METHOD FOR MOBILE TERMINAL DEVICE

(71) Applicant: KYOCERA Corporation, Kyoto (JP)

(72) Inventors: Kenichi Hirako, Osaka (JP); Shinichi Onaru, Osaka (JP); Saki Yamasaki, Daito (JP); Toshihiro Kamii, Osaka (JP); Kana Masaki, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/347,341

(22) PCT Filed: Aug. 7, 2013

(86) PCT No.: PCT/JP2013/071349
§ 371 (c)(1),
(2) Date: Mar. 26, 2014

(87) PCT Pub. No.: WO2014/024917
PCT Pub. Date: Feb. 13, 2014

(65) Prior Publication Data
US 2014/0235228 A1    Aug. 21, 2014

(30) Foreign Application Priority Data

Aug. 10, 2012  (JP) ................................ 2012-178246
Jan. 29, 2013  (JP) ................................ 2013-014866

(51) Int. Cl.
*H04M 3/00*       (2006.01)
*H04W 52/02*      (2009.01)
*H04M 1/725*      (2006.01)

(52) U.S. Cl.
CPC ...... *H04W 52/0258* (2013.01); *H04M 1/72597* (2013.01);
(Continued)

(58) Field of Classification Search
CPC ............... H04M 1/72597; H04M 1/72558; H04M 1/72519; H04M 1/6066; H04M 1/72522; H04M 1/72547; H04M 1/2335; H04M 1/72552; H04M 2201/40; H04M 2250/16; H04M 1/72577; H04W 88/06; H04W 88/00; H04W 88/02; H04W 48/04; H04W 4/001; H04H 60/91; H04L 29/06027; H04L 67/12; H04L 67/306; H04L 67/34
USPC ................ 455/418, 456.1, 456.4, 151.1, 352; 715/200, 201, 203, 706, 736
See application file for complete search history.

(56) References Cited

U.S. PATENT DOCUMENTS 6,407,325 B2 *  6/2002  Yi et al. ........................ 84/610
2009/0303066 A1 * 12/2009  Lee et al. ..................... 340/679

(Continued)

FOREIGN PATENT DOCUMENTS

| JP | 2009-289039 A | 12/2009 |
| JP | 2010-278803 A | 12/2010 |
| JP | 2012-138904 A | 7/2012 |

OTHER PUBLICATIONS

International Search Report dated Sep. 3, 2013, issued for International Application No. PCT/JP2013/071349.
Written Opinion of the International Searching Authority dated Sep. 3, 2013, issued by Japan Patent Office for International Application No. PCT/JP2013/071349.

*Primary Examiner* — Nimesh Patel
(74) *Attorney, Agent, or Firm* — Procopio, Cory, Hargreaves & Savitch LLP

(57) ABSTRACT

A mobile telephone includes a communication module, and a control module configured to perform background communication with respect to an application via the communication module. The control module restricts background communication, based on an activation history of the application in foreground. The control module includes a determination module configured to determine whether background communication is unnecessary based on the activation history of the application in foreground with respect to each of the applications, and a setting switching module configured to switch communication setting of the application, of which background communication is determined to be unnecessary, from a first setting of permitting the background communication to a second setting of restricting the background communication.

12 Claims, 33 Drawing Sheets

(52) U.S. Cl.
CPC ...... *H04W 52/0264* (2013.01); *H04M 1/72522* (2013.01)

USPC .................. 455/418; 455/456.1; 455/456.4; 455/151.1; 455/352; 715/200; 715/201; 715/203; 715/706; 715/736

(56) References Cited

U.S. PATENT DOCUMENTS

2011/0143730 A1* 6/2011 Zaffino et al. .............. 455/414.1
2012/0163232 A1   6/2012 Yoo

* cited by examiner

COMMUNICATION SETTING DATABASE

| APPLICATION NAME | LATEST ACTIVATION DATE AND TIME IN FOREGROUND | COMMUNICATION SETTING | EXCLUSION SETTING |
|---|---|---|---|
| APPLICATION A | 25 JULY, 2012 | ON | OFF |
| APPLICATION B | 05 JUNE, 2012 | OFF | OFF |
| APPLICATION C | 20 MAY, 2012 | OFF | OFF |
| APPLICATION D | 10 JULY, 2012 | ON | ON |
| ........ | ........ | ........ | ........ |

FIG. 3

COMMUNICATION SETTING DATABASE

| APPLICATION NAME | NUMBER OF TIMES OF ACTIVATION IN FOREGROUND | COMMUNICATION SETTING | EXCLUSION SETTING |
|---|---|---|---|
| APPLICATION A | 3 | ON | OFF |
| APPLICATION B | 1 | OFF | OFF |
| APPLICATION C | 0 | OFF | OFF |
| APPLICATION D | 5 | ON | ON |
| ········ | ········ | ········ | ········ |

FIG. 6

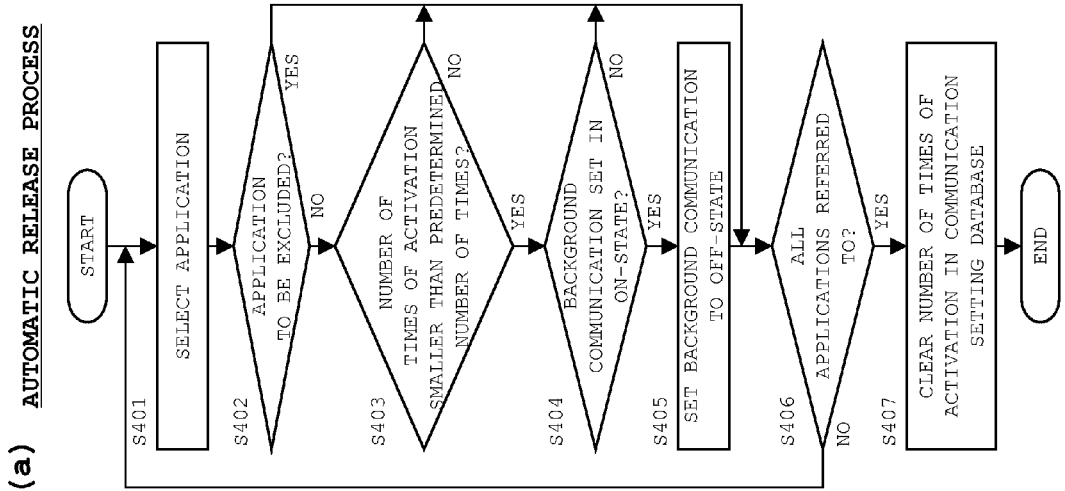
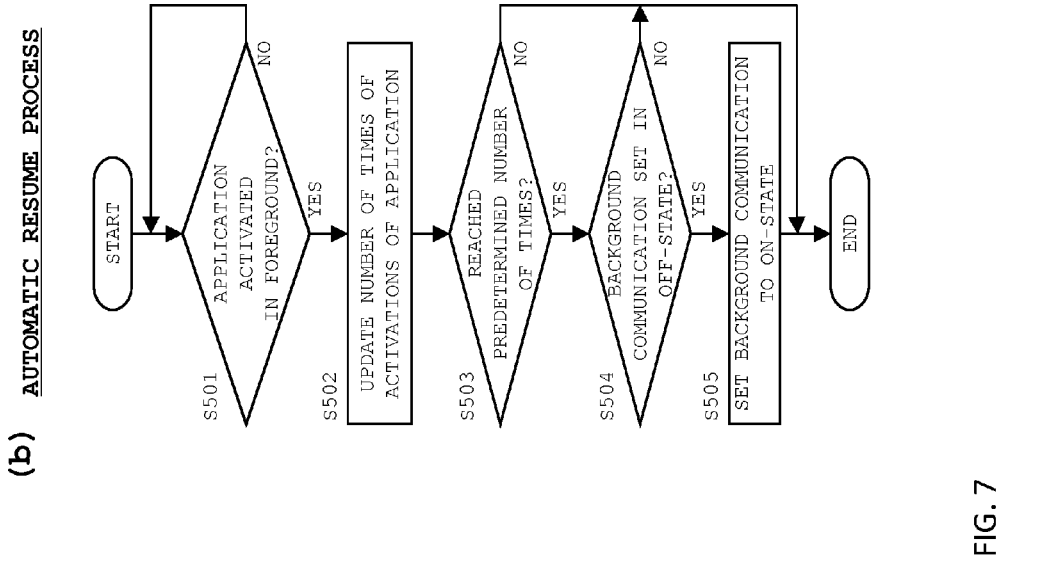
FIG. 7

COMMUNICATION SETTING DATABASE

| APPLICATION NAME | COMMUNICATION SETTING | EXCLUSION SETTING |
|---|---|---|
| APPLICATION A | ON | OFF |
| APPLICATION B | OFF | OFF |
| APPLICATION C | OFF | OFF |
| APPLICATION D | ON | ON |
| ......... | ......... | ......... |

FIG. 16

(a) ACTIVATION HISTORY DATABASE

| APPLICATION A | APPLICATION B | APPLICATION C |
|---|---|---|
| JANUARY 08, 2013, 09:00 AM | JANUARY 02, 2013, 03:00 PM | JANUARY 05, 2013, 08:00 PM |
| JANUARY 10, 2013, 10:00 AM | JANUARY 03, 2013, 03:30 PM | JANUARY 12, 2013, 10:30 PM |
| JANUARY 15, 2013, 09:30 AM | JANUARY 04, 2013, 05:30 PM | JANUARY 19, 2013, 09:00 PM |
| JANUARY 24, 2013, 01:15 PM | JANUARY 07, 2013, 04:15 PM | JANUARY 26, 2013, 08:30 PM |
| ........ | ........ | ........ |

12c (b) COMMUNICATION SETTING TABLE

| APPLICATION NAME | COMMUNICATION MODE |
|---|---|
| APPLICATION A | NON-RESTRICTION |
| APPLICATION B | RESTRICTION |
| APPLICATION C | NON-RESTRICTION |
| ........ | ........ |

| DAY OF WEEK | ACTIVATION/NON-ACTIVATION IN FOREGROUND | | | PRESENCE/ABSENCE OF BACKGROUND COMMUNICATION |
|---|---|---|---|---|
| | 1 WEEK AGO | 2 WEEKS AGO | 3 WEEKS AGO | |
| MONDAY | × | × | × | × |
| TUESDAY | × | × | × | × |
| WEDNESDAY | × | × | × | × |
| THURSDAY | ○ | ○ | × | ○ |
| FRIDAY | × | × | × | × |
| SATURDAY | × | × | × | × |
| SUNDAY | × | ○ | ○ | ○ |

FIG. 22

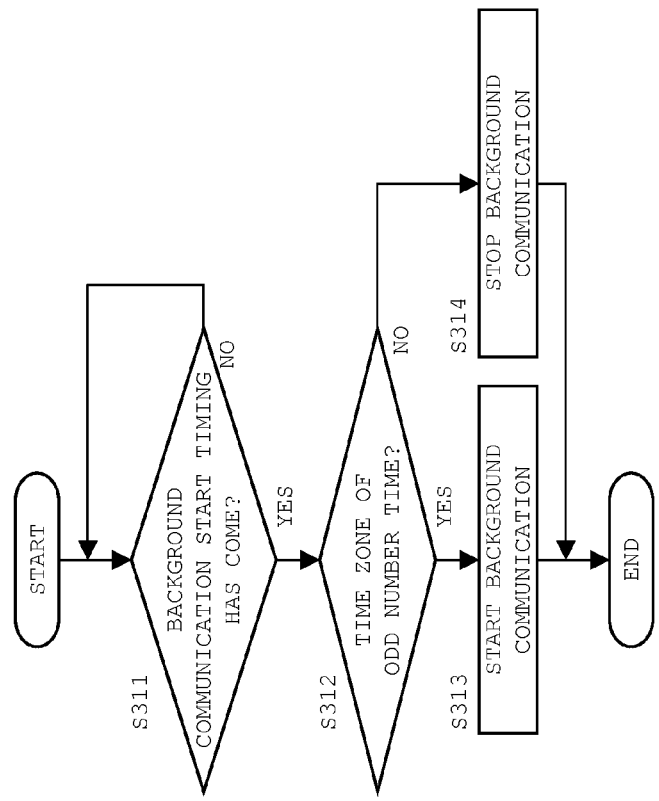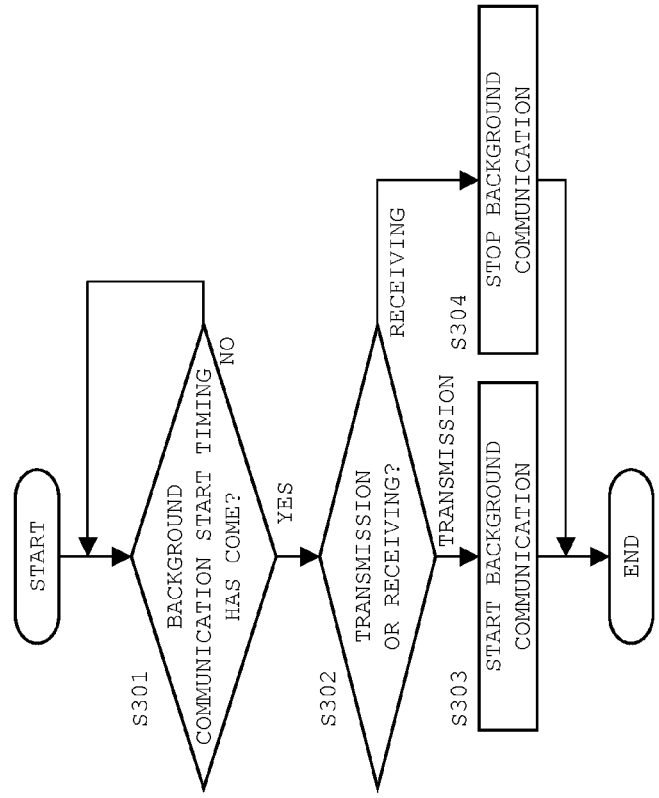
FIG. 23

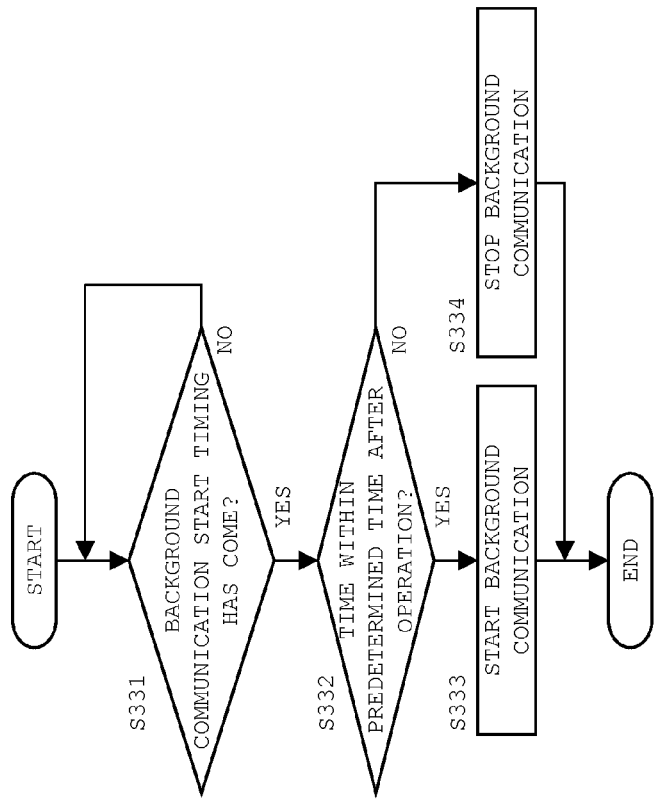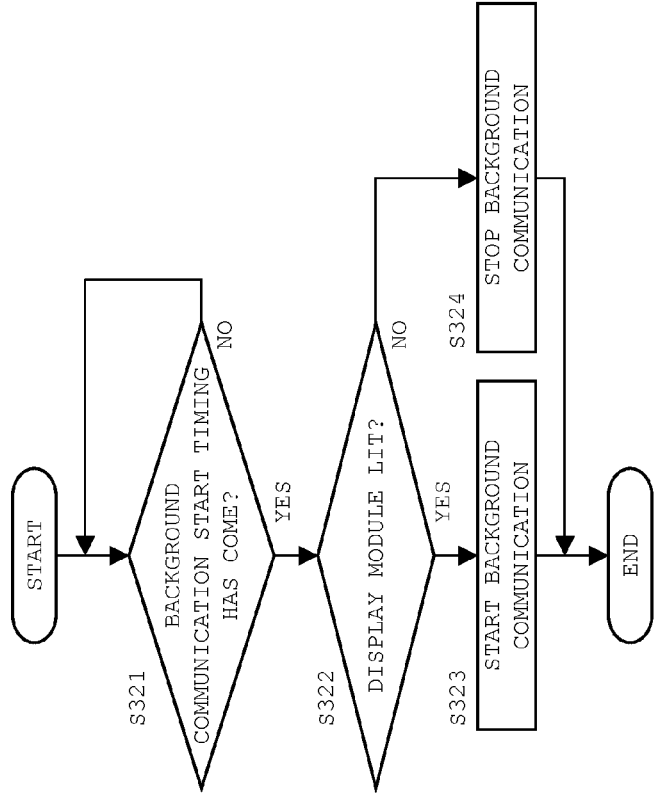
FIG. 24

| TIME ZONE | ACTIVATION/NON-ACTIVATION IN FOREGROUND | | | PRESENCE/ABSENCE OF BACKGROUND COMMUNICATION |
|---|---|---|---|---|
| | 1 DAY AGO | 2 DAYS AGO | 3 DAYS AGO | |
| 12:00 AM~ 4:00 AM | × | × | × | × |
| 4:00 AM~ 8:00 AM | × | × | × | × |
| 8:00AM~ 12:00PM | × | × | × | × |
| 12:00 PM~ 4:00 PM | ○ | ○ | × | ○ |
| 4:00 PM~ 8:00 PM | × | × | × | × |
| 8:00 PM~ 12:00AM | × | ○ | ○ | ○ |

FIG. 27

(a) __CONNECTION HISTORY DATABASE__

| COMMUNICATION METHOD A | COMMUNICATION METHOD B | COMMUNICATION METHOD C |
|---|---|---|
| JANUARY 08, 2013, 09:00 AM | JANUARY 02, 2013, 03:00 PM | JANUARY 02, 2013, 08:00 PM |
| JANUARY 10, 2013, 10:00 AM | JANUARY 03, 2013, 03:30 PM | JANUARY 03, 2013, 03:00 PM |
| JANUARY 15, 2013, 09:30 AM | JANUARY 04, 2013, 05:30 PM | JANUARY 04, 2013, 05:30 PM |
| JANUARY 24, 2013, 01:15 PM | JANUARY 07, 2013, 04:15 PM | JANUARY 05, 2013, 08:00 PM |
| ........ | ........ | ........ |

12e (b) __COMMUNICATION SETTING TABLE__

| APPLICATION NAME | SEARCH INTERVAL |
|---|---|
| COMMUNICATION APPLICATION BY COMMUNICATION METHOD A | FIRST TIME |
| COMMUNICATION APPLICATION BY COMMUNICATION METHOD B | SECOND TIME |
| COMMUNICATION APPLICATION BY COMMUNICATION METHOD C | FIRST TIME |
| ........ | ........ |

12f

SECOND TIME>FIRST TIME

FIG. 28

MOBILE TERMINAL DEVICE, AND CONTROL METHOD FOR MOBILE TERMINAL DEVICE

TECHNICAL FIELD

The present invention relates to a mobile terminal device such as a mobile telephone, a PDA (Personal Digital Assistant), a tablet PC, and an electronic book terminal. The present invention also relates to a control method suitable for use in the mobile terminal device.

BACKGROUND ART

In recent years, a mobile terminal device such as a mobile telephone is capable of simultaneously executing a plurality of application programs (hereinafter, simply called as "applications").

In such a mobile terminal device, data communication with an external communication device is periodically performed for data updating and the like in an application whose execution screen is not displayed on a display surface, and which is executed in a state inoperable by the user, in other words, in an application executed in background. If the amount of data communication executed in background (hereinafter, called as "background communication") increases, the electric power consumption also increases. This may cause exhaustion of the battery of the mobile terminal device.

It is possible to suppress exhaustion of the battery by turning off the setting of background communication in an application in which data updating and the like is not necessary.

SUMMARY OF INVENTION

Technical Problem

In a conventional mobile terminal device, however, the user has to manually switch the background communication setting from an on-state to an off-state with respect to each of the applications. Such an operation is cumbersome to the user.

In view of the above, there is a need for a mobile terminal device and a control method for the mobile terminal device that enable to suppress exhaustion of a battery without any extra operation by a user.

Solution to Problem

A mobile terminal device according to a first aspect of the invention includes a communication module, and a control module configured to perform background communication with respect to an application via the communication module. In the above configuration, the control module restricts the background communication, based on an activation history of the application in foreground.

A second aspect of the invention relates to a control method for a mobile terminal device configured to perform background communication with respect to an application. The control method according to the second aspect includes a step of referring to an activation history of the application in foreground, and a step of restricting the background communication based on the activation history.

Advantageous Effects of Invention

According to the invention, it is possible to suppress exhaustion of a battery without any extra operation by a user.

The effect and the significance of the present invention will further be apparent from the description of the following embodiment. The embodiment is merely one example for carrying out the invention, and the invention is not limited to the following embodiment.

BRIEF DESCRIPTION OF DRAWINGS

FIG. 3 is a diagram showing a configuration of a communication setting database according to the first embodiment;

FIG. 6 is a diagram showing a configuration of a communication setting database according to a first modification of the first embodiment;

FIGS. 7A and 7B are flowcharts respectively showing an automatic release process and an automatic resume process of background communication according to the first modification;

FIG. 16 is a diagram showing a configuration of a communication setting database according to another modification of the first embodiment;

FIGS. 19A and 19B are diagrams respectively showing a configuration of an activation history database and a configuration of a communication setting table according to a first example of the second embodiment;

FIG. 22 is a diagram exemplifying an execution state of background communication in a certain week in a certain application according to the first example;

FIGS. 23A and 23B are respectively a flowchart showing a communication process of restricting one of transmission and receiving, and a flowchart showing a communication process of restricting background communication depending on a time zone according to a first modification of the first example;

FIGS. 24A and 24B are respectively a flowchart showing a communication process of restricting background communication depending on a lit state of a display module, and a flowchart showing a communication process of restricting background communication depending on an elapse of time after the mobile telephone has been operated according to the first modification of the first example;

FIG. 27 is a diagram exemplifying an execution state of background communication on a certain day in a certain application according to the second example;

FIGS. 28A and 28B are diagrams respectively showing a configuration of a connection history database and a configuration of a communication setting table according to a third example of the second embodiment;

DESCRIPTION OF EMBODIMENTS

<First Embodiment>

Figure 1:
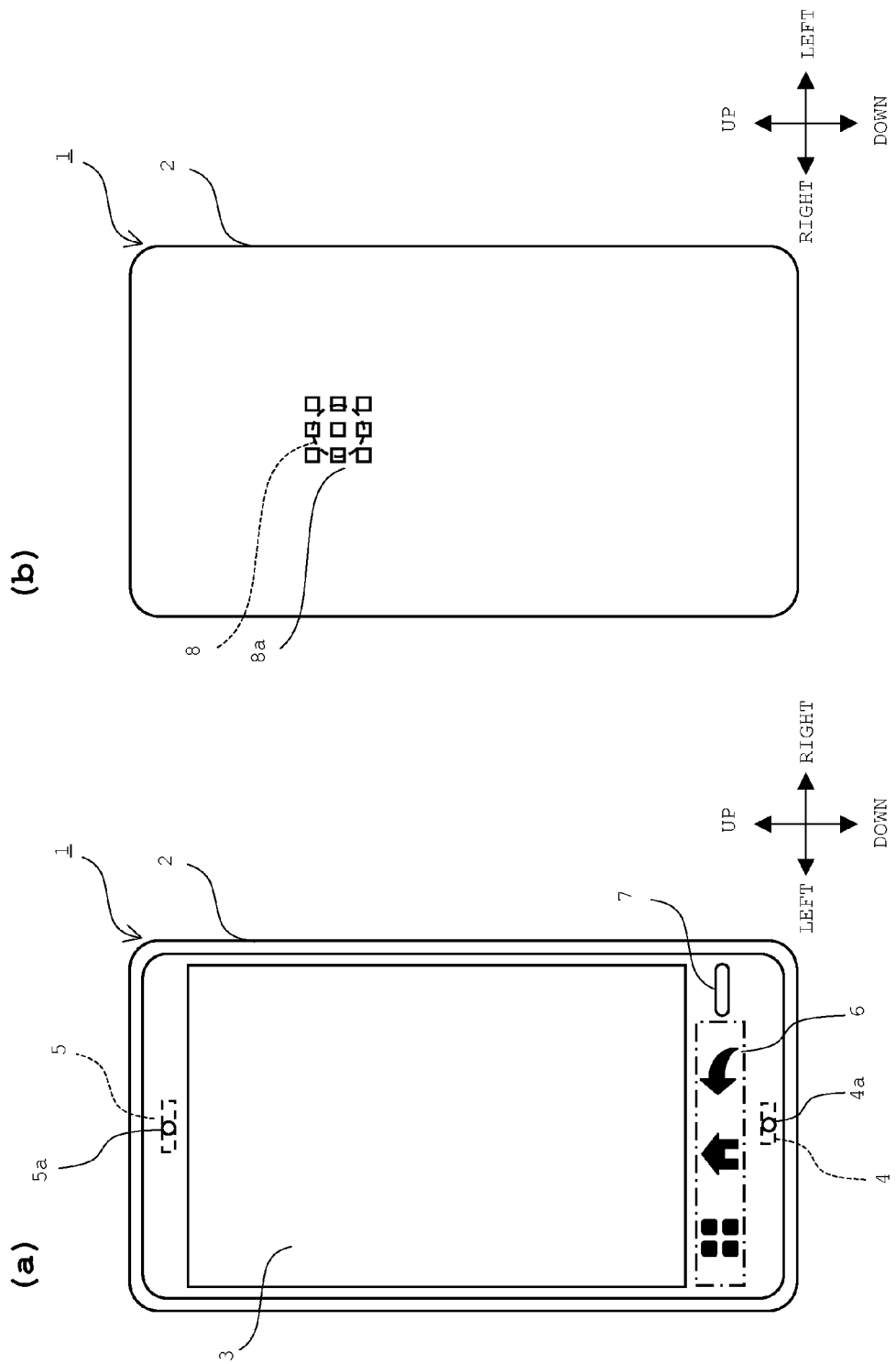
FIGS. 1A and 1B are diagrams showing a configuration of a mobile telephone according to a first embodiment.

In the following, the first embodiment of the invention is described referring to the drawings.

FIGS. 1A and 1B are diagrams showing a configuration of a mobile telephone 1. FIGS. 1A and 1B are a front view and a back view of the mobile telephone 1, respectively.

In the following, to simplify the description, as shown in FIGS. 1A and 1B, the lengthwise direction of a cabinet 2 is defined as up and down directions, and the shortwise direction of the cabinet 2 is defined as left and right directions.

The mobile telephone 1 includes the cabinet 2, a display surface 3, a microphone 4, the communication speaker 5, a key operation part 6, a power source key 7 and an external speaker 8.

The cabinet 2 has an almost rectangular outline as viewed from the front side. The cabinet 2 includes on a front surface thereof a display surface 3 of a display module 13 which is described later. Various images (screens) are displayed on the display surface 3.

The microphone 4 is disposed within the cabinet 2 at a lower end part thereof, and the communication speaker 5 is disposed within the cabinet 2 at an upper end part thereof. Sounds are input into the microphone 4 through a microphone hole 4a formed in a front surface of the cabinet 2. The microphone 4 generates electric signals according to the input sounds. Sounds are mainly output from the communication speaker 5. The output sounds are released to the outside via an output hole 5a formed in the front surface of the cabinet 2.

The cabinet 2 includes a key operation part 6 and the power source key 7 on the front surface. The key operation part 6 includes a plurality of operation keys. The operation keys are assigned various functions for operating a program under execution or the like. When the power source key 7 is pressed in a power-off state of the mobile telephone 1, the power source of the mobile telephone 1 is brought to an on-state. When the power source key 7 is continued to be pressed for a predetermined time or more in a power-on state of the mobile telephone 1, the power source of the mobile telephone 1 is turned off.

The cabinet 2 includes the external speaker 8 therewithin. The cabinet 2 has on the back surface thereof an output hole 8a corresponding to the external speaker 8. Sounds (voices, notification sounds, and the like) output from the external speaker 8 are released to the outside via the output hole 8a.

Figure 2:
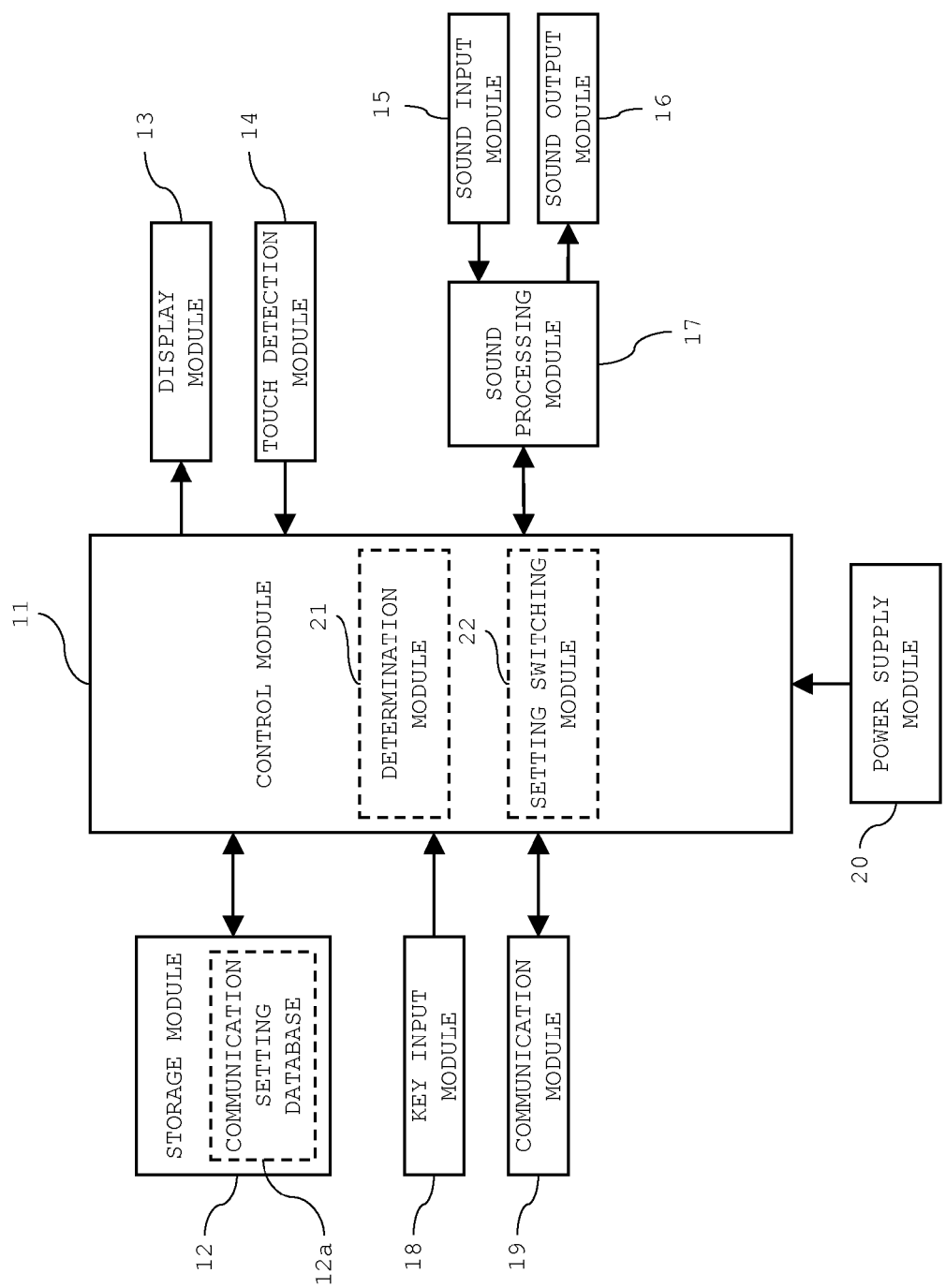
FIG. 2 is a block diagram showing an entire configuration of the mobile telephone according to the first embodiment.

FIG. 2 is a block diagram of an entire configuration of the mobile telephone 1. The mobile telephone 1 includes a control module 11, a storage module 12, a display module 13, a touch detection module 14, a sound input module 15, a sound output module 16, a sound processing module 17, a key input module 18, a communication module 19, and a power supply module 20.

The storage module 12 includes a ROM, a RAM, an external memory and the like. The storage module 12 stores various programs. The programs stored in the storage module 12 include control programs for controlling components of the mobile telephone 1 and various applications (for telephone, e-mail, map, game, schedule management, for example). The programs are stored in the storage module 12 at the time of manufacturing of the mobile telephone 1 by the manufacturer, and are also stored in the storage module 12 by the user via a communication network or a storage medium.

The storage module 12 also includes a working area for storing data temporarily used or generated in executing a program.

The control module 11 includes a CPU and the like. The control module 11 controls components (the storage module 12, the display module 13, the touch detection module 14, the sound input module 15, the sound output module 16, the sound processing module 17, the key input module 18, the communication module 19, and others) constituting the mobile telephone 1 according to the programs.

The display module 13 includes a liquid crystal display and the like. The display module 13 displays an image (screen) on the display surface 3 according to a control signal and an image signal from the control module 11. The display module 13 is not limited to the liquid crystal display but may be any other display device such as an organic EL display.

The touch detection module 14 includes a touch panel for detecting touch of a finger with the display surface 3 and the like. The touch panel is in the form of a transparent sheet, and is disposed on the front surface of the cabinet 2 while covering the display surface 3. The touch panel may be a touch panel of various types such as electrostatic capacity type, ultrasonic type, pressure-sensitive type, resistance film type, and photosensitive type.

The touch detection module 14 detects a user touch operation onto the display surface 3. Specifically, the touch detection module 14 detects a position on the display surface 3 touched by the finger as an input position, and outputs a position signal indicative of the detected input position to the control module 11.

The user can perform various touch operations by touching the display surface 3 with his/her finger. The touch operations include a tap operation, a flick operation, a slide operation, and the like. The tap operation is an operation of contacting the finger with the display surface 3 and then releasing the finger from the display surface 3 within a short time. The flick operation is an operation of flipping the display surface 3 in an arbitrary direction with the finger. The slide operation is an operation of moving the finger on the display surface 3 in an arbitrary direction while keeping the finger in contact with the display surface 3.

The touch operation is described in details. For instance, in the case where the touch detection module 14 is incapable of detecting an input position within a predetermined first time after the input position with respect to the display surface 3 has been detected by the touch detection module 14, the control module 11 determines that a tap operation has been performed. In the case where the touch detection module 14 is incapable of detecting an input position after the input position with respect to the display surface 3 has been detected by the touch detection module 14, and the input position has been moved by a predetermined first distance or more within a predetermined second time, the control module 11 determines that a flick operation has been performed. In the case where an input position is moved by a predetermined second distance or more after the input position with respect to the display surface 3 has been detected by the touch detection module 14, the control module 11 determines that a slide operation has been performed.

The sound input module 15 includes the microphone 4 and the like. The sound input module 15 outputs electric signals from to the microphone 4 to the sound processing module 17.

The sound output module 16 includes the communication speaker 5, the external speaker 8, and others. The sound output module 16 receives an electric signal from the sound processing module 17, and outputs sound (voice, notification sound, and the like) from the communication speaker 5 or from the external speaker 8.

The sound processing module 17 subjects an electric signal from the sound input module 15 to A/D conversion and the like, and outputs a converted digital sound signal to the control module 11. The sound processing module 17 subjects the digital sound signal from the control module 11 to a decoding process and D/A conversion and the like, and outputs a converted electric signal to the sound output module 16.

When any of the operation keys in the key operation part is pressed, the key input module 18 outputs a signal corresponding to the pressed operation key to the control module 11.

To perform telephone calls and data communications, the communication module 19 includes a circuit for signal conversion, an antenna for radio wave transmission/reception, and the like. The communication module 19 converts a signal for telephone calls or data communications input from the control module 11 into a radio signal, and transmits the converted radio signal via the antenna to a base station or another communication device or the like as a destination of communications. Furthermore, the communication module 19 also converts radio signals received via the antenna into a signal in a form capable of being used by the control module 11, and outputs the converted signal to the control module 11.

The power supply module 20 includes a battery, and supplies electric power to the control module 11 and the like. Further, the power supply module 20 includes a voltage detection module for detecting a voltage of the battery, and outputs the voltage detected by the voltage detection module to the control module 11. The control module 11 detects a remaining amount of the battery based on the detected voltage.

The storage module 12 stores therein a communication setting database 12a for use in an automatic release process and an automatic resume process of background communication to be described later.

FIG. 3 is a diagram showing a configuration of the communication setting database 12a. The communication setting database 12a stores therein data of each of the applications loaded in the mobile telephone 1, namely, the application name, a latest date and time (hereinafter, called as a "latest activation date and time") when each of the applications has been activated in foreground, a communication setting flag, and an exclusion setting flag.

The communication setting flag is a flag for setting whether background communication is to be performed. The communication setting flag is set to an on-state or to an off-state in the automatic release process and in the automatic resume process.

The exclusion setting flag is a flag for setting whether an application corresponding to the exclusion setting flag is to be excluded from the automatic release process of background communication. In this embodiment, the exclusion setting flag is set to an on-state or to an off-state in advance by the manufacturer at the time of manufacturing. For instance, the application whose exclusion flag is set to an on-state is an application, of which restriction of background communication is not desirable, such as an application of acquiring and notifying emergency information by periodically communicating with a site providing the emergency information.

The communication setting database 12a is generated by the control module 11 when the mobile telephone 1 is activated for the first time. When a new application is added to the mobile telephone 1, the data on the added application is added in the communication setting database 12a.

The mobile telephone 1 is capable of simultaneously executing a plurality of applications. An application to be operated is executed in foreground, and the execution screen (the operation screen) of the application is displayed on the display surface 3. The rest of the applications are executed in background without displaying the execution screens thereof on the display surface 3.

The control module 11 periodically executes background communication of an application executed in background and whose background communication is set to an on-state, in other words, an application whose setting flag in the communication setting database 12a is set to an on-state for data updating relating to the application and the like.

The control module 11 executes an automatic release process and an automatic resume process for automatically setting on and off of background communication depending on an activation state of the application in foreground, in other words, depending on an activation history of the application in foreground. Further, the control module 11 executes a temporary resume process for temporarily resuming background communication of an application whose background communication is set to an off-state, during a charging period of the mobile telephone 1.

The control module 11 includes a determination module 21 and a setting switching module 22. In the automatic release process, the determination module 21 determines whether an application has been activated in foreground for a predetermined period or more, based on the latest activation date and time stored in the communication setting database 12a with respect to each of the applications.

The setting switching module 22 switches communication setting relating to background communication between an on-state and an off-state. In the automatic release process, the setting switching module 22 switches communication setting from an on-state to an off-state with respect to an application which is determined not to have been activated in foreground for a predetermined period or more by the determination module 21, and which is not set as an application to be excluded. Further, in the automatic resume process, the setting switching module 22 switches communication setting from an off-state to an on-state, in the case where an application which is switched to an off-state is activated in foreground. Further, in the temporary resume process, in the case where the mobile telephone 1 is in a charging period, the setting switching module 22 switches communication setting of an application which is switched to an off-state, from an off-state to an on-state.

Figure 4:
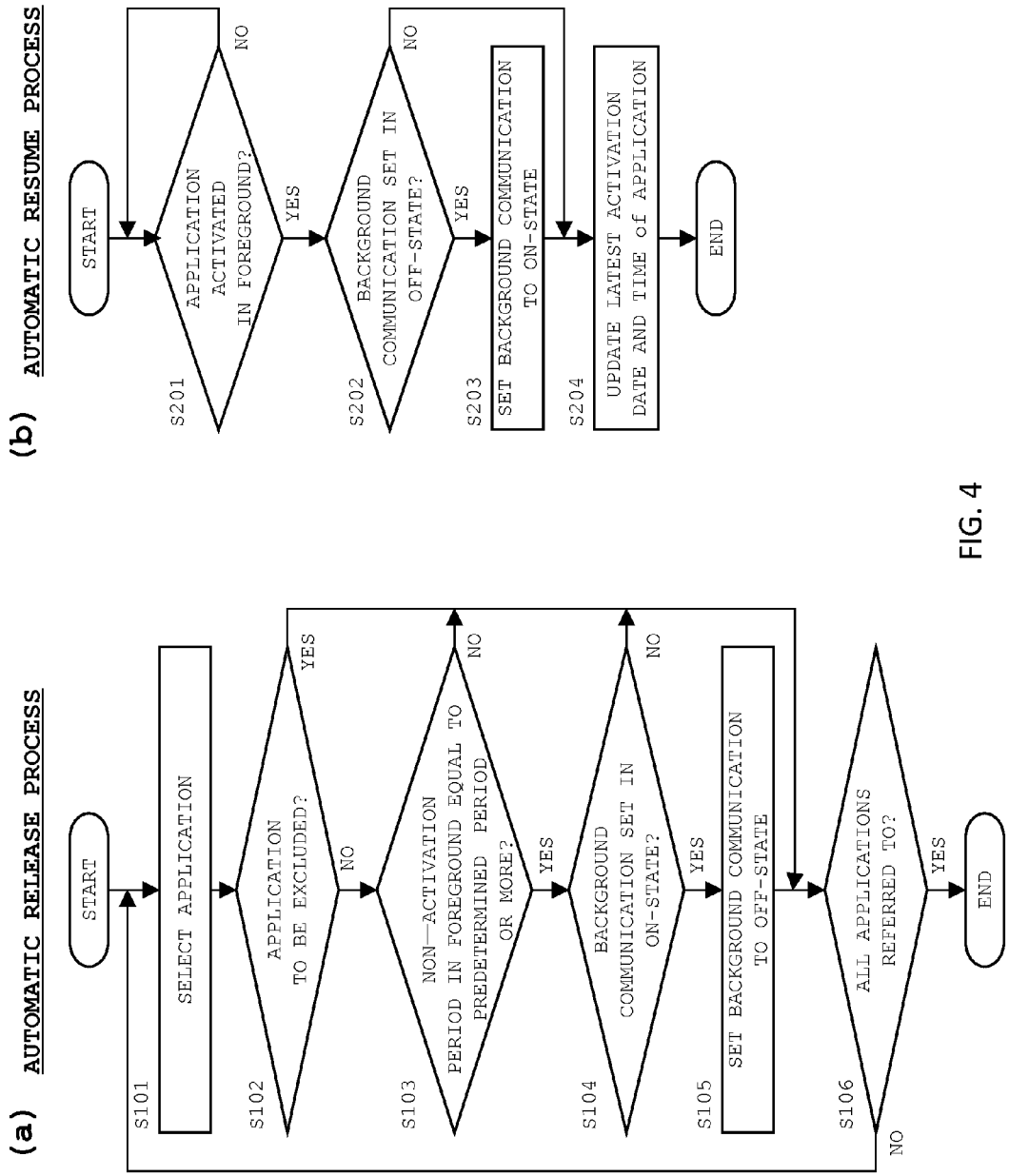
FIGS. 4A and 4B are flowcharts respectively showing an automatic release process and an automatic resume process of background communication according to the first embodiment.

FIGS. 4A and 4B are flowcharts respectively showing an automatic release process and an automatic resume process of background communication.

Referring to FIG. 4A, the automatic release process is described. The automatic release process is repeatedly executed at a predetermined time interval (e.g. every several minutes to every several ten minutes).

The control module 11 selects an application to be referred to from the communication setting database 12a (S101). The control module 11 determines whether the selected application is an application to be excluded by checking the exclusion setting flag (S102). In the case where the exclusion setting flag is in an off-state, and the selected application is not an application to be excluded (S102: NO), the control module 11 (the determination module 21) determines whether a period (hereinafter, called as a "non-activation period") when the application has not been activated in foreground is equal to a predetermined period (for instance, one week) or more, based on the latest activation date and time and a current date and time (S103). The latest activation date and time is updated by the automatic resume process to be described later, each time the application is activated in foreground.

In the case where the non-activation period of the selected application is equal to the predetermined period or more (S103: YES), the control module 11 determines whether background communication is set to an on-state by checking the communication setting flag (S104). In the case where the communication setting flag is set to an on-state, and background communication is set to an on-state (S104: YES), the control module 11 (the setting switching module 22) sets background communication to an off-state by setting the communication setting flag to an off-state (S105).

The control module 11 determines whether all the applications registered in the communication setting database 12a have been referred to (S106). In the case where the selected application is an application to be excluded (S102: YES), or in the case where the non-activation period of the selected application is shorter than the predetermined period (S103: NO), and in the case where background communication has already been set to an off-state regardless that the non-activation period is not shorter than the predetermined period (S104: NO), the control module 11 proceeds to Step S106, without switching communication setting of background communication.

In the case where it is determined that all the applications have not been referred to (S106: NO), the control module 11 returns to the process of Step S101, and selects an application to be referred to next. The control module 11 executes the processes from Step S102 to Step S105 with respect to the selected application. When all the applications have been referred to (S106: YES), the process is ended.

As described above, by executing the automatic release process, background communication is automatically switched from an on-state to an off-state with respect to an application which has not been activated in foreground for a predetermined period or more. Background communication is not performed thereafter with respect to an application whose background communication is switched to an off-state.

In the following, the automatic resume process is described referring to FIG. 4B.

The control module 11 determines whether one of the applications has been activated in foreground (S201). In the case where an application in a finished state is activated, the application is activated in foreground. In response to a predetermined operation of activating an application, which is executed in background, in foreground, the application is activated in foreground.

In the case where one of the applications is activated in foreground (S201: YES), the control module 11 determines whether background communication of the application is set to an off-state (S202). In the case where background communication is set to an off-state (S202: YES), the control module 11 (the setting switching module 22) sets background communication of the application which is activated in foreground to an on-state by setting the communication setting flag to an on-state (S203).

Background communication is resumed with respect to an application whose background communication is switched to an on-state, at the point of time when execution of the application is switched from foreground to background.

Further, the control module 11 updates the latest activation date and time of the application which is activated in foreground to the date and time when the application has been activated in the communication setting database 12a (S204), and the process is ended. Immediately after the process is ended, the automatic resume process is executed again, and activation of the application in foreground is monitored (S201).

The predetermined period may be set to any value by a user operation.

In the case where an application is activated in foreground, the control module 11 performs data communication with a predetermined device such as a server in foreground for data updating and the like.

In some of the applications, a large amount of communication data may be generated, in the case where data communication is performed in foreground after background communication has been interrupted. For instance, in an application relating to an SNS (Social Networking Service), synchronous communication is performed in order to make the state of data of the server and the state of data of the mobile telephone 1 coincident with each other. As a result of the synchronous communication, a large amount of communication data may be generated when data communication is resumed in foreground. Such a synchronous communication may cause drastic exhaustion of the battery.

In view of the above, in the embodiment, a temporary resume process of background communication is executed by the control module 11. The off-state of background communication is temporarily released (background communication is temporarily switched to an on-state) during a charging period when it is not necessary to worry about exhaustion of the battery, whereby background communication is enabled.

Figure 5:
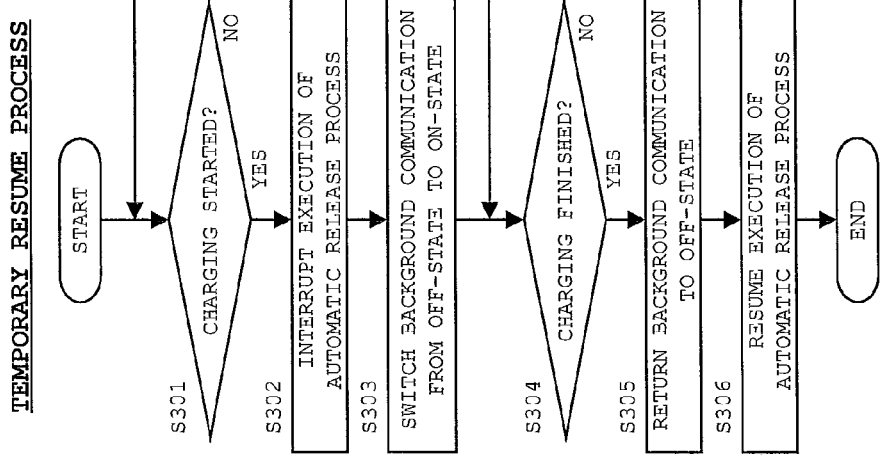
FIG. 5 is a flowchart showing a temporary resume process of background communication according to the first embodiment.

FIG. 5 is a flowchart showing the temporary resume process of background communication.

The control module 11 monitors whether charging of the mobile telephone 1 is started (S301). In the case where start of charging is detected (S301: YES), the control module 11 interrupts execution of the automatic release process (S302). By performing the above operation, there is no likelihood that background communication is switched from an on-state to an off-state during a charging period.

Subsequently, the control module 11 (the setting switching module 22) switches communication setting of an application, whose background communication is set to an off-state, from an off-state to an on-state (S303). By performing the above operation, background communication of the application which is switched to an on-state is resumed.

The control module 11 monitors whether charging is finished, in other words, whether the mobile telephone 1 is detached from a commercial power supply (S304). In the case where charging is finished (S304: YES), the control module 11 (the setting switching module 22) returns communication setting of the application which is switched to an on-state, from an on-state to an off-state (S305). By performing the above operation, background communication of the application which is returned to an off-state is restricted again.

The control module 11 resumes execution of the automatic release process (S306), and the process is ended. Immediately after the process is ended, the temporary resume process is executed again, and start of charging is monitored (S301).

As described above, according to the embodiment, it is possible to automatically set background communication of an application which is not used by the user to an off-state. The above configuration makes it possible to suppress electric power consumption of the mobile telephone 1 to thereby suppress exhaustion of the battery.

Further, according to the embodiment, it is possible to automatically set background communication of an application, which is activated in foreground after background communication has been set to an off-state, to an on-state. This makes it possible to speedily resume background communication of an application which is brought to a state usable by the user.

Further, according to the embodiment, background communication is not restricted with respect to an application which is set as an application to be excluded, regardless of the use state of the user. This makes it possible to prevent restriction of background communication of an application, of which restriction of background communication is not desirable.

Further, according to the embodiment, the off-state of background communication is temporarily released during a charging period, and background communication is enabled. This makes it possible to prevent generation of a large amount of communication data, in the case where communication is performed in foreground after background communication has been interrupted.

<First Modification of First Embodiment>

In the embodiment, in the case where an application has not been activated in foreground for a predetermined period or more, it is regarded that background communication is unnecessary because the application is not used by the user, and communication setting of background communication of the application is switched from an on-state to an off-state.

In the present modification, in the case where the number of times of activation of an application in foreground for a predetermined period is smaller than a predetermined number of times, it is regarded that background communication is unnecessary, and communication setting of background communication of the application is switched from an on-state to an off-state.

FIG. 6 is a diagram showing a configuration of the communication setting database 12a according to the present modification. As shown in FIG. 6, the communication setting database 12a stores therein the number of times of activation of an application in foreground, in place of the latest activation date and time.

FIGS. 7A and 7B are flowcharts respectively showing an automatic release process and an automatic resume process of background communication according to the present modification.

Referring to FIG. 7A, the automatic release process of the present modification is described. The automatic release process is executed, each time a predetermined period (for instance, every week) is elapsed.

The control module 11 selects an application to be referred to from the communication setting database 12a (S401), and determines whether the selected application is an application to be excluded (S402). In the case where the selected application is not an application to be excluded (S402: NO), the control module 11 (the determination module 21) determines whether the number of times of activation of the selected application is smaller than a predetermined number of times (for instance, two times) (S403).

In the case where the number of times of activation of the selected application is smaller than the predetermined number of times (S403: YES), the control module 11 determines whether background communication is set to an on-state (S404). In the case where background communication is set to an on-state (S404: YES), the control module 11 (the setting switching module 22) sets background communication to an off-state (S405).

The control module 11 determines whether all the applications registered in the communication setting database 12a have been referred to (S406). In the case where the selected application is an application to be excluded (S402: YES), in the case where the number of times of activation of the selected application is not smaller than the predetermined number of times (S403: NO), and in the case where background communication has already been set to an off-state, regardless that the number of times of activation is smaller than the predetermined number of times (S404: NO), the control module 11 proceeds to Step S406 without switching communication setting of background communication.

In the case where the control module 11 determines that all the applications have not been referred to (S406: NO), the control module 11 returns to the process of Step S401, and selects an application to be referred to next. The control module 11 executes the processes from Step S402 to Step S405 with respect to the selected application. In the case where all the applications have been referred to (S406: YES), the control module 11 clears the number of times of activation with respect to all the applications registered in the communication setting database 12a (S407), and the process is ended.

As described above, by executing the automatic release process, background communication is automatically switched from an on-state to an off-state with respect to an application, whose number of times of activation in foreground for a predetermined period is smaller than a predetermined number of times. Background communication is not performed thereafter with respect to an application whose background communication is switched to an off-state.

In the following, the automatic resume process of the present modification is described referring to FIG. 7B.

In the case where one of the applications is activated in foreground (S501: YES), the control module 11 updates the number of times of activation of the application (S502). Specifically, the control module 11 increments the number of times of activation by one.

Subsequently, the control module 11 determines whether the number of times of activation has reached a predetermined number of times (corresponding to the predetermined number of times in the invention) (S503). In the case where the number of times of activation has reached the predetermined number of times (S503: YES), the control module 11 determines whether background communication of the application is set to an off-state (S504). In the case where background communication is set to an off-state (S504: YES), the control module 11 (the setting switching module 22) sets background communication of the application which is activated in foreground to an on-state (S505). Thus, the automatic resume process is ended.

According to the present modification, substantially the same advantageous effects as in the embodiment can be obtained.

It should be noted that at least one of the predetermined period and the predetermined number of times may be optionally set by a user operation.

Further, in the foregoing embodiment, the automatic resume process shown in FIG. 7B of the present modification may be executed, in place of the automatic resume process shown in FIG. 4B. In this case, the number of times of activation is stored in the communication setting database 12a shown in FIG. 3. Further, a process of clearing the number of times of activation of a target application is executed following the process of Step S105 shown in FIG. 4A. Furthermore, the process of Step S204 shown in FIG. 4B is executed following the process of Step S505 shown in FIG. 7B, for updating the latest activation date and time.

In addition, in the present modification, the automatic resume process shown in FIG. 4B of the embodiment may be executed, in place of the automatic resume process shown in FIG. 7B. In this case, the process of Step S204 shown in FIG. 4B is omitted.

<Second Modification of First Embodiment>

In the present modification, the predetermined period to be compared with the non-activation period in the automatic release process shown in FIG. 4B is extended, based on a judgment that the power source of the mobile telephone 1 is turned off.

Figure 8:
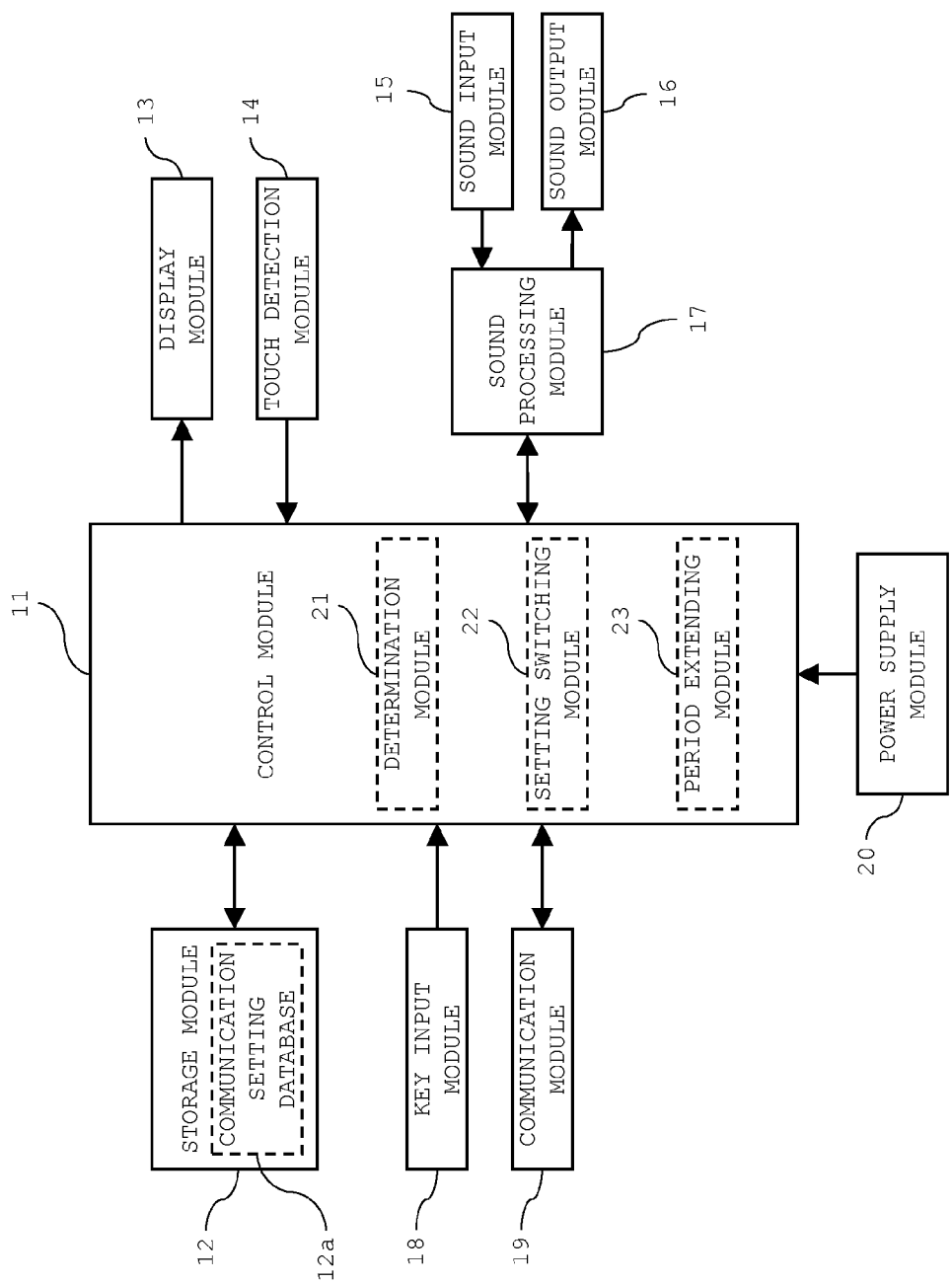
FIG. 8 is a block diagram showing an entire configuration of a mobile telephone according to a second modification of the first embodiment.

FIG. 8 is a block diagram showing an entire configuration of the mobile telephone 1 according to the present modification. In the present modification, the control module 11 includes a period extending module 23, in addition to the determination module 21 and the setting switching module 22. The period extending module 23 executes an off-time storing process and a predetermined period extending process. The other configuration is substantially the same as in the embodiment.

Figure 9:
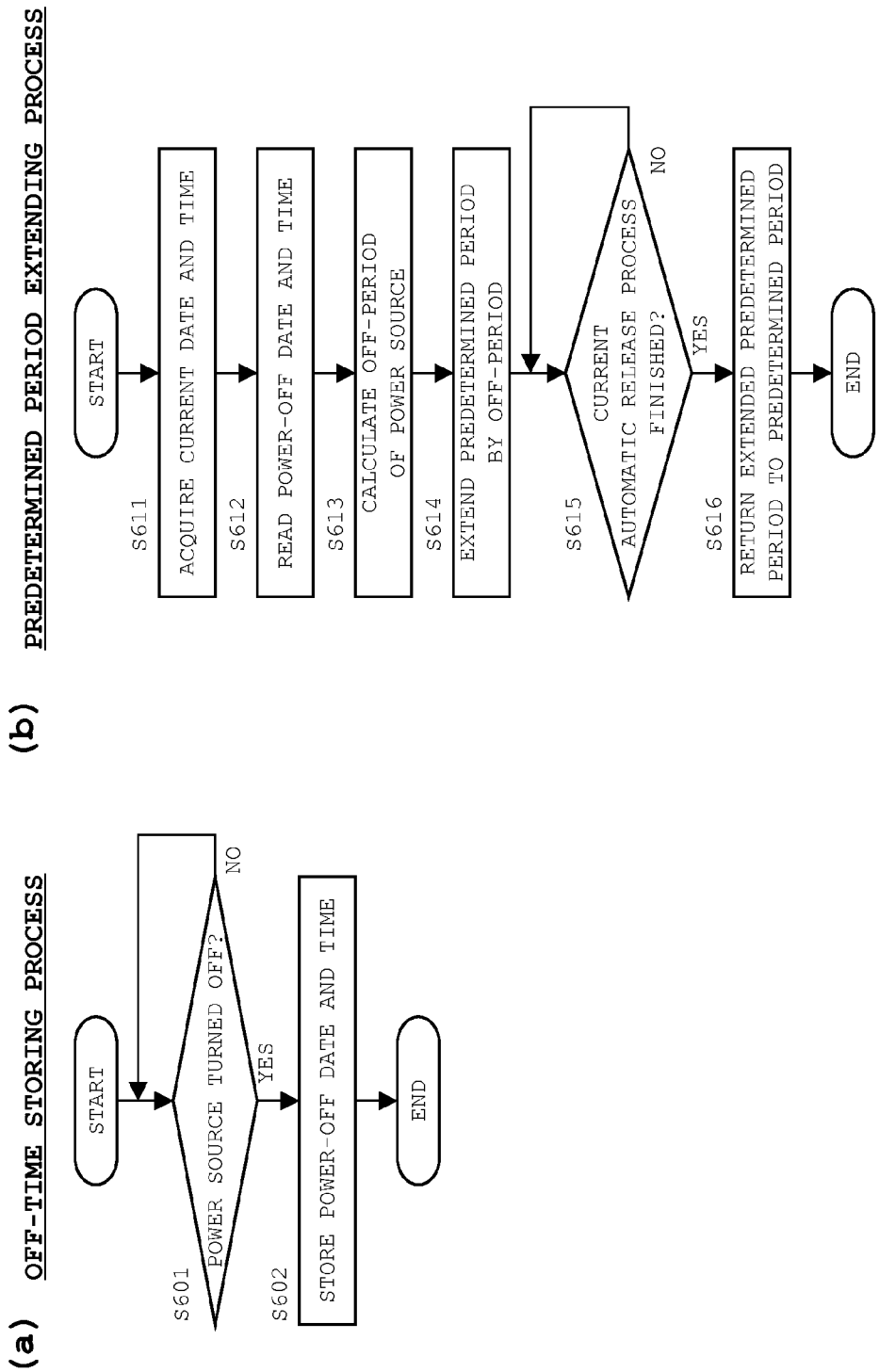
FIGS. 9A and 9B are flowcharts respectively showing an off-time storing process and a predetermined period extending process according to the second modification.

FIGS. 9A and 9B are flowcharts respectively showing the off-time storing process and the predetermined period extending process.

As shown in FIG. 9A, in the case where an operation of turning off the power source of the mobile telephone 1 is performed, in other words, in the case where an operation of continuing to press the power source key 7 for a predetermined time or more is performed (S601: YES), the period extending module 23 stores the date and time (hereinafter, called as an "off date and time") when the operation has been performed in the storage module 12 (S602).

The predetermined period extending process shown in FIG. 9B is executed in the case where the power source of the mobile telephone 1 is brought to an on-state, and the mobile telephone 1 is activated.

The period extending module 23 acquires a current date and time from a timer provided in the control module 11 (S611), reads the off date and time from the storage module 12 (S612), and calculates an off period of the power source from the current date and time and the off date and time (S613). The control module 11 extends the predetermined period by the off period of the power source (S614). For instance, in the case where the predetermined period is one week, and the power source of the mobile telephone 1 is turned off for one week, the predetermined period is extended to two weeks in the case where the power source is brought to an on-state thereafter.

In the case where the current automatic release process defined by the extended predetermined period is finished (S615: YES), the period extending module 23 returns the extended predetermined period to the predetermined period (S616), and the process is ended.

According to the present modification, it is possible to automatically turn off background communication by discriminating the use state of an application, without being affected by the period when the power source of the mobile telephone 1 is turned off.

The configuration of the present modification may also be applied to the configuration of the first modification. In this case, the period extending module 23 extends the predetermined period during which the automatic resume process shown in FIG. 7B is repeated, in the process of Step S514 of the predetermined period extending process.

In the foregoing example, in the case where an off period is generated, the predetermined period is always extended by the off period. Alternatively, the predetermined period may be extended by an off period, only in the case where the off period exceeds a certain period.

<Third Modification of First Embodiment>

In the embodiment, an application to be excluded is set in advance by the manufacturer. In the present modification, an application to be excluded may be set by the user.

Figure 10:
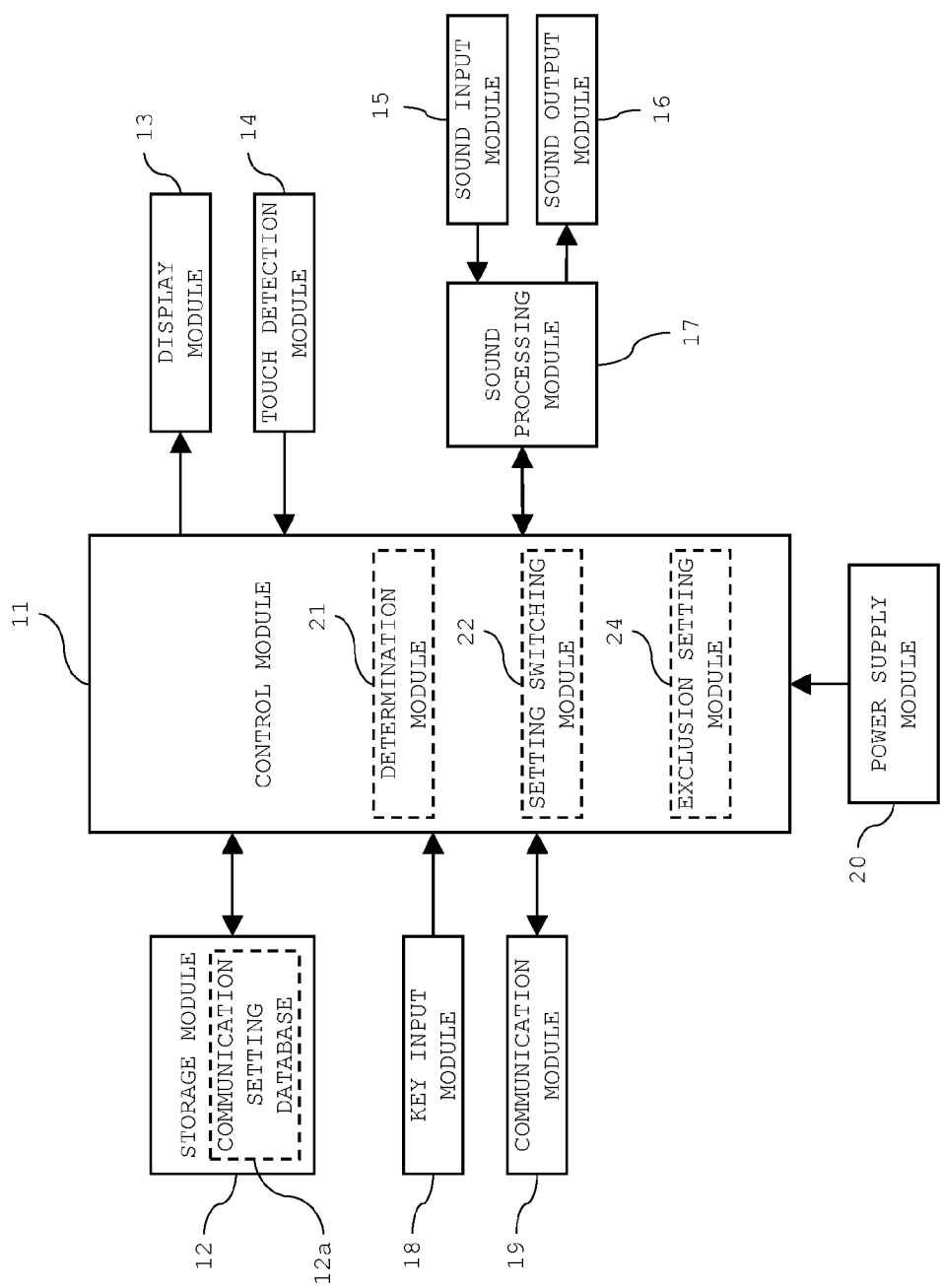
FIG. 10 is a block diagram showing an entire configuration of a mobile telephone according to a third modification of the first embodiment.

FIG. 10 is a block diagram showing an entire configuration of the mobile telephone 1 according to the present modification. In the present modification, the control module 11 includes an exclusion setting module 24 in addition to the determination module 21 and the setting switching module 22. The exclusion setting module 24 executes an exclusion setting process. The other configuration is substantially the same as in the embodiment.

Figure 11:
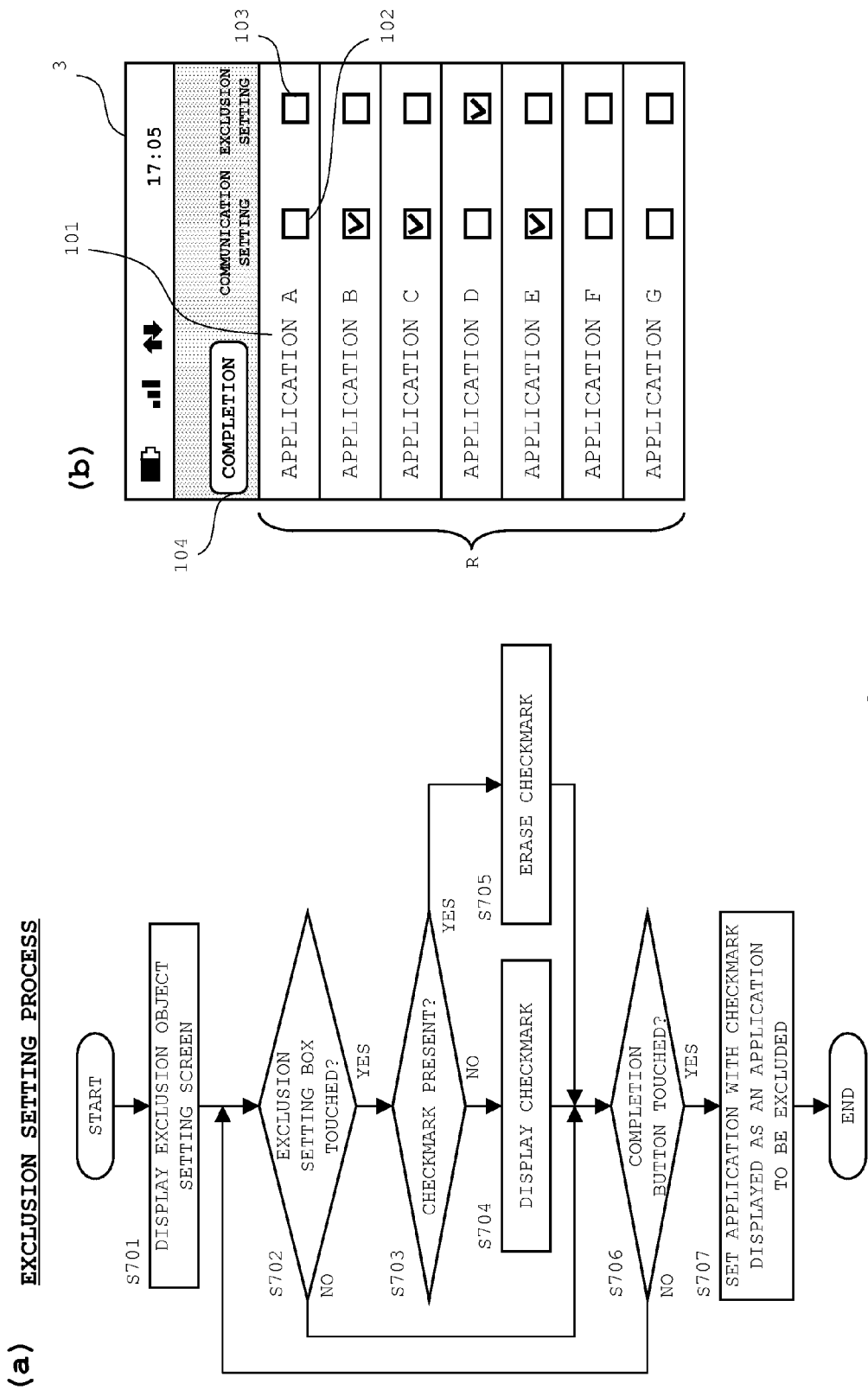
FIGS. 11A and 11B are respectively a flowchart showing an exclusion setting process, and a diagram showing an example of an exclusion object setting screen to be displayed on a display surface in the exclusion setting process according to the third modification.

FIG. 11A is a flowchart showing the exclusion setting process. FIG. 11B is a diagram showing an example of an exclusion object setting screen to be displayed on the display surface 3 in the exclusion setting process.

In response to a predetermined user operation of setting an application to be excluded, the exclusion setting process is started. The exclusion setting module 24 displays an exclusion object setting screen on the display surface 3 (S701). For instance, as shown in FIG. 11B, in the exclusion object setting screen, a list of the applications registered in the communication setting database 12a is displayed on a list display area R. In response to a flick operation in upward direction or in downward direction in the list display area R, the screen is scrolled to thereby display the applications that have not been displayed in the list display area R.

In a display area 101 of each of the applications, there are provided two checkboxes i.e. a communication setting box 102 and an exclusion setting box 103 on the side of the name of each of the applications. A checkmark is currently displayed in the communication setting box 102 of each of the applications whose background communication is set to an off-state. Further, a checkmark is currently displayed in the exclusion setting box 103 of each of the applications set as an application to be excluded. Furthermore, a completion button 104 is disposed above the list display area R in the exclusion object setting screen.

In the case where the user intends to exclude an application that is not set as an application to be excluded, the user touches on the exclusion setting box 103 of the intended application. A checkmark is not initially displayed in the exclusion setting box 103 of the intended application. Further, in the case where the user intends to eliminate an application that is set as an application to be excluded from the applications to be excluded, the user touches on the exclusion setting box 103 of the intended application. A checkmark is initially displayed in the exclusion setting box 103 of the intended application.

In response to a user operation of touching the exclusion setting box 103 of one of the applications (S702: YES), the exclusion setting module 24 determines whether a checkmark is displayed in the touched exclusion setting box 103 (S703). In the case where a checkmark is not displayed in the exclusion setting box 103 (S703: NO), the exclusion setting module 24 displays a checkmark in the exclusion setting box 103 (S704). In the case where a checkmark is displayed in the exclusion setting box 103 (S703: YES), the exclusion setting module 24 erases the checkmark (S705).

Until the completion button 104 is touched (S706: NO), the exclusion setting module 24 repeatedly executes the processes from Step S702 to Step S705. In response to a user operation of touching the completion button 104 (S706: YES), the exclusion setting module 24 sets the exclusion setting flag of the application in the communication setting database 12*a*, whose checkmark is displayed in the exclusion setting box 103, to an on-state to thereby set the application as an application to be excluded (S707). Thereafter, the exclusion setting module 24 closes the exclusion object setting screen, and the process is ended.

According to the present modification, the user is allowed to set an application, of which background communication the user does not intend to automatically turn off, as an application to be excluded.

In the exclusion object setting screen, a list of the applications, of which background communication has been performed for a predetermined period in the past (for instance, for one month) may be displayed, in place of displaying a list of all the applications registered in the communication setting database 12*a*.

Further, in response to a user operation of touching a checkmarked communication setting box 102, communication setting of background communication of the application corresponding to the touched communication setting box 102 may be switched from an off-state to an on-state, and in response to a user operation of touching a non-checkmarked communication setting box 102, communication setting of background communication of the application corresponding to the touched communication setting box 102 may be switched from an on-state to an off-state.

Further, in the case where a checkmark is attached to the exclusion setting box 103, and the application corresponding to the checkmarked exclusion setting box 103 is switched to an application to be excluded, communication setting of background communication of the application may be automatically switched to an on-state, when communication setting of background communication of the application is in an off-state. In this case, the checkmark attached to the communication setting box 102 is automatically erased.

Further, in the case where a new application is installed, there may be a case that communication setting of background communication of the application is set to an off-state in advance, or the application is set as an application to be excluded in advance. In this case, a checkmark may be automatically attached to the communication setting box 102 or to the exclusion setting box 103 in adding a new application on the exclusion object setting screen.

<Fourth Modification of First Embodiment>

Figure 12:
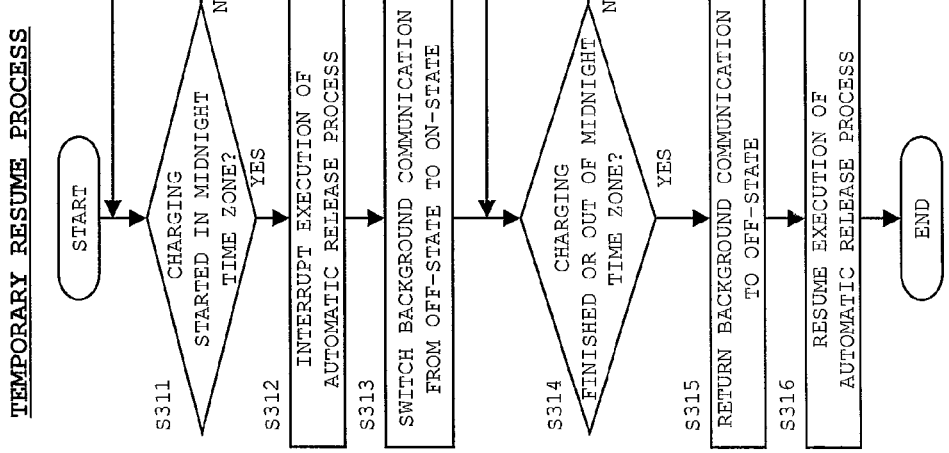
FIG. 12 is a flowchart showing a temporary resume process of background communication according to a fourth modification of the first embodiment.

FIG. 12 is a flowchart showing a temporary resume process of background communication according to the present modification.

In the embodiment, in the case where the mobile telephone 1 is in a charging period, the off-state of background communication is temporarily released. On the other hand, in the present modification, in the case where the mobile telephone 1 is in a charging period and the time is in a midnight time zone, the off-state of background communication is temporarily released.

The control module 11 monitors whether charging of the mobile telephone 1 is started in a midnight time zone (S311). For instance, a time zone from AM 0:00 to AM 5:00 is set as a midnight time zone. In the case where start of charging in the midnight time zone is detected (S311: YES), the control module 11 interrupts execution of the automatic release process (S312). Subsequently, the control module 11 (the setting switching module 22) switches communication setting of an application whose background communication is set to an off-state, from an off-state to an on-state (S313).

The control module 11 monitors whether charging is finished, and whether the time is out of the midnight time zone (S314). In the case where charging is finished, or in the case where the time is out of the midnight time zone (S314: YES), the control module 11 (the setting switching module 22) returns communication setting of the application whose background communication is temporarily switched to an on-state, to an off-state (S315). Subsequently, the control module 11 resumes execution of the automatic release process (S316), and the process is ended.

In the case where the off-state of background communication is temporarily released, and background communication is resumed, the amount of communication may increase by the amount of data corresponding to the period when background communication has not been performed. As a result, in the case where the user performs data communication by the other application at the time when background communication is resumed, a temporary increase in the data traffic may temporarily lower the communication rate relating to the data communication. This may make the user feel inconvenience in use.

According to the present modification, the off-state of background communication is temporarily released in a midnight time zone when the user frequency of using the mobile telephone 1 is low. This is advantageous in preventing the user from feeling inconvenience in use.

Figure 13:
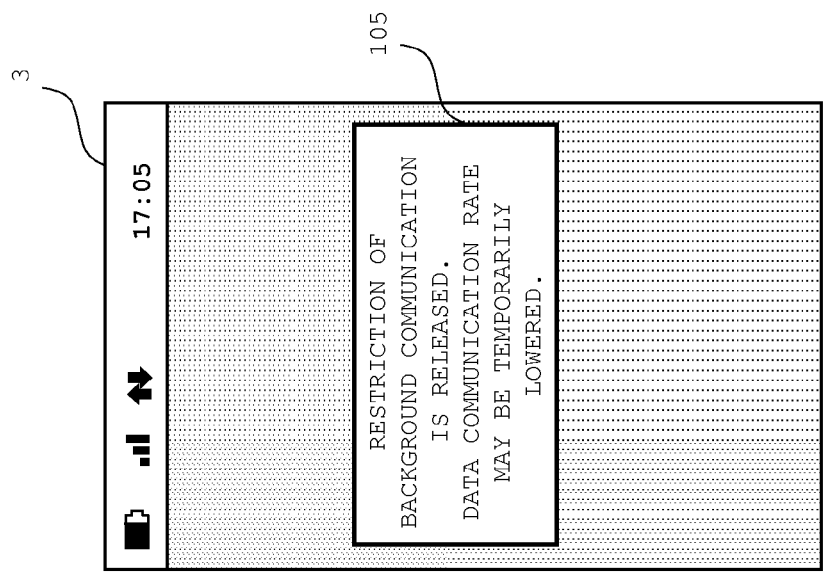
FIG. 13 is a diagram showing an example of a notification window to be displayed on a display surface according to the fourth modification.

In the configurations of the embodiment and the present modification, in the case where background communication is temporarily resumed, as shown in FIG. 13, the control module 11 may cause the display surface 3 to display a notification window 105 of notifying the user that the data communication rate may be temporarily lowered, as a popup image. This makes it possible for the user to recognize that the data communication rate may be lowered.

<Fifth Modification of First Embodiment>

There is an application such as a game application, in which various advertisement information is displayed in the execution screen thereof. Advertisement information is updated by background communication during a time when the application is executed in background. It is often the case that the user does not need such an advertisement information updating.

In view of the above, the mobile telephone 1 according to the present modification is provided with an advertisement blocking function of blocking data communication, in the case where background communication relates to advertisement information.

Figure 14:
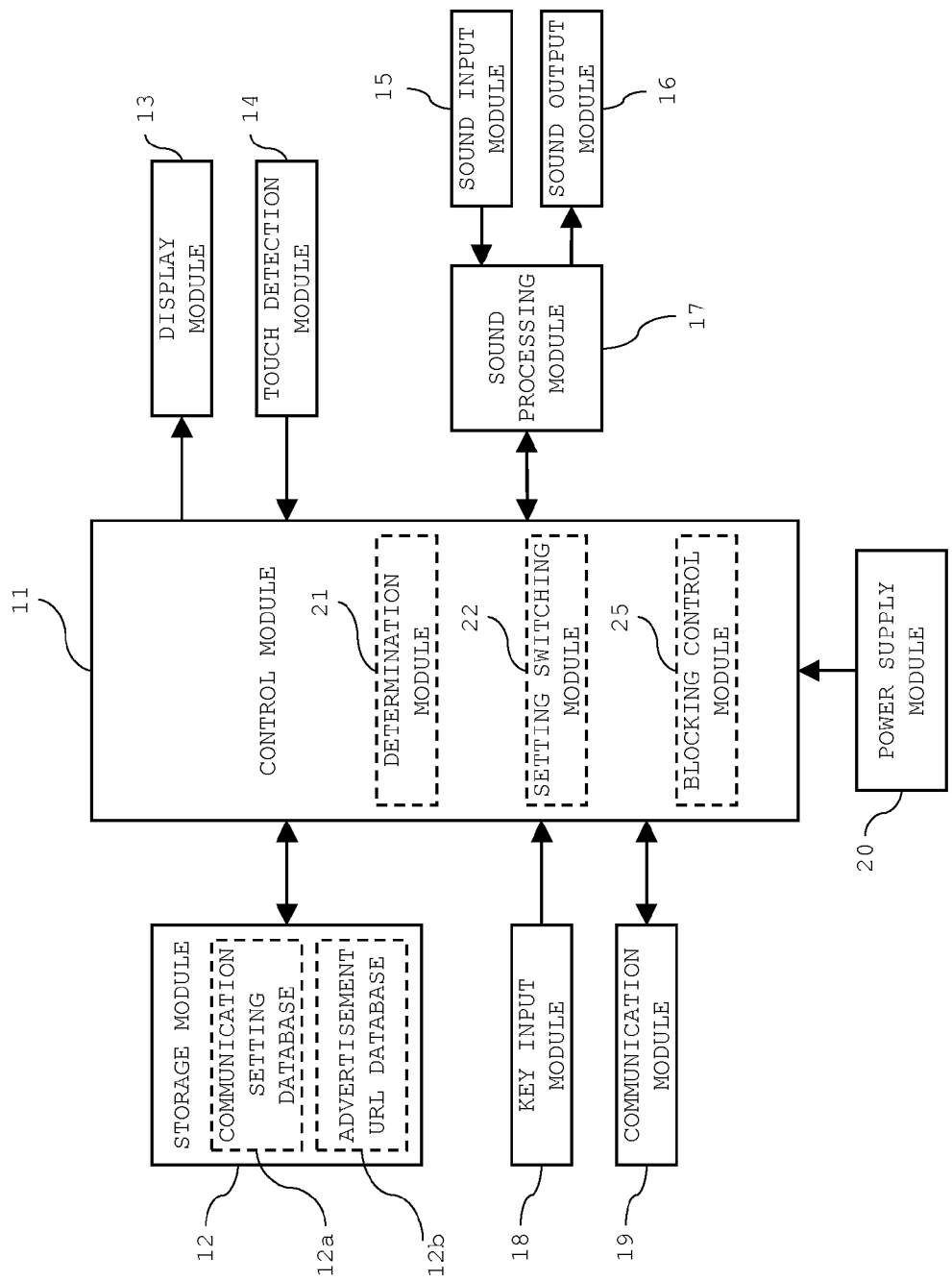
FIG. 14 is a block diagram showing an entire configuration of a mobile telephone according to a fifth modification of the first embodiment.

FIG. 14 is a block diagram showing an entire configuration of the mobile telephone 1 according to the present modification. In the present modification, the control module 11 includes a blocking control module 25 in addition to the determination module 21 and the setting switching module 22. The blocking control module 25 executes an advertisement blocking process. The storage module 12 stores therein an advertisement URL database 12*b* for use in the advertisement blocking process. The other configuration is substantially the same as in the embodiment.

Figure 15:
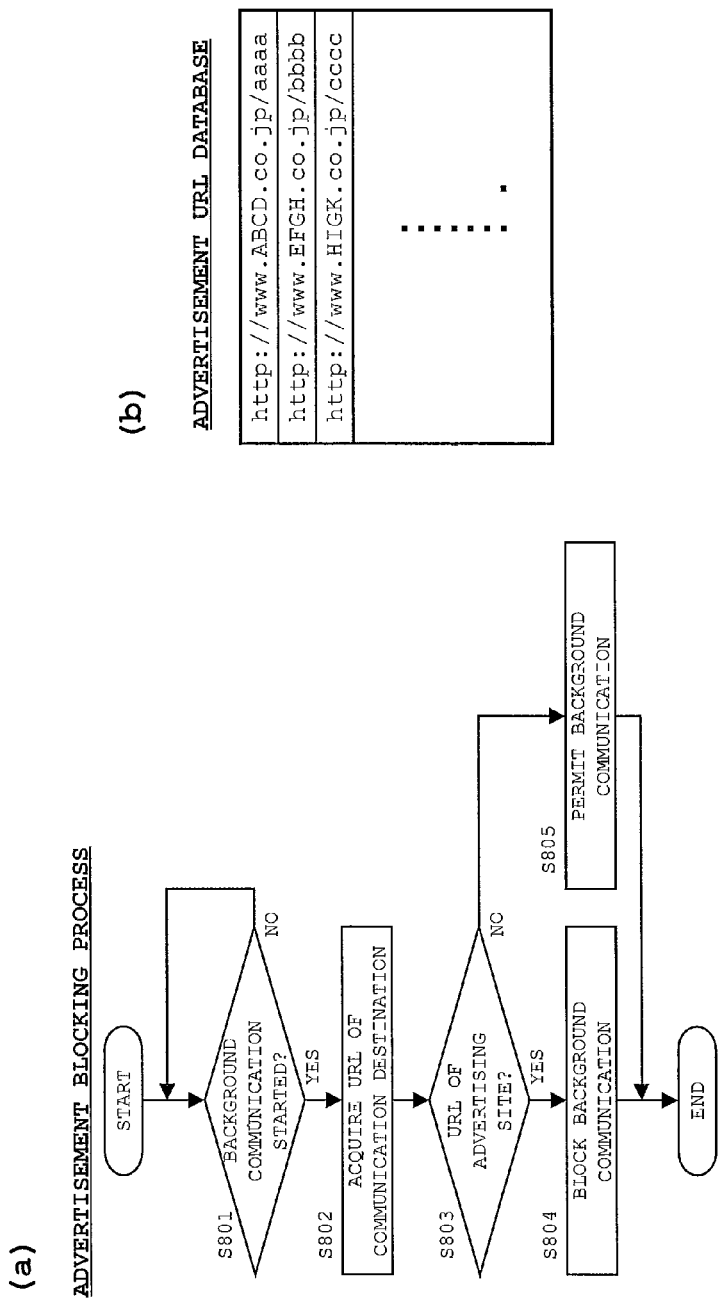
FIGS. 15A and 15B are diagrams for describing an advertisement blocking process according to the fifth modification.

FIG. 15A and FIG. 15B are diagrams for describing the advertisement blocking process. FIG. 15A is a flowchart showing the advertisement blocking process, and FIG. 15B is a diagram showing a configuration of the advertisement URL database 12*b*.

The advertisement blocking process is executed in the case where the user sets in advance an advertisement blocking mode with use of a predetermined setting screen.

The blocking control module 25 monitors whether background communication is started (S801). In the case where background communication is started (S801: YES), the blocking control module 25 acquires the URL of a communication destination (S802).

As shown in FIG. 15B, the URLs of advertising sites to be communicated for updating advertisement information are registered in the advertisement URL database 12*b*. The URLs of advertising sites are periodically acquired from a predetermined site managing advertisement. By performing the above operation, data updating within the advertisement URL database 12*b* is performed.

The blocking control module 25 determines whether the acquired URL is the URL of an advertising site by comparing between the acquired URL and the URLs registered in the advertisement URL database 12*b* (S803).

In the case where the acquired URL is the URL of an advertising site (S803: YES), the blocking control module 25 blocks background communication with the acquired URL (S804). By performing the above operation, the control module 11 is inoperative to perform background communication with the acquired URL.

On the other hand, in the case where the acquired URL is not the URL of an advertising site (S803: NO), the blocking control module 25 permits background communication with the acquired URL (S805). By performing the above operation, the control module 11 is operative to perform background communication with the acquired URL.

According to the present modification, it is possible to block background communication relating to advertisement information. This is advantageous in suppressing exhaustion of the battery of the mobile telephone 1.

<Other Modification of First Embodiment>

In the foregoing, the embodiment and the modifications of the embodiment are described. The invention is not limited by the embodiment and the like. Further, the embodiment of the invention may be modified in various ways other than the above.

For instance, in the embodiment, an application which has not been activated in foreground for a predetermined period or more is extracted by detecting a state of the application at a predetermined time interval, and background communication of the application is set to an off-state.

Alternatively, the following configuration may be applied in order to set background communication to an off-state by detecting an application which has not been activated in foreground for a predetermined period or more.

As shown in FIG. 16, latest activation dates and times are not stored in the communication setting database 12*a*. In place of the above, the control module 11 is provided with a plurality of timers for use in the automatic release process. Each of the timers measures a predetermined period (for instance, one week).

Figure 17:
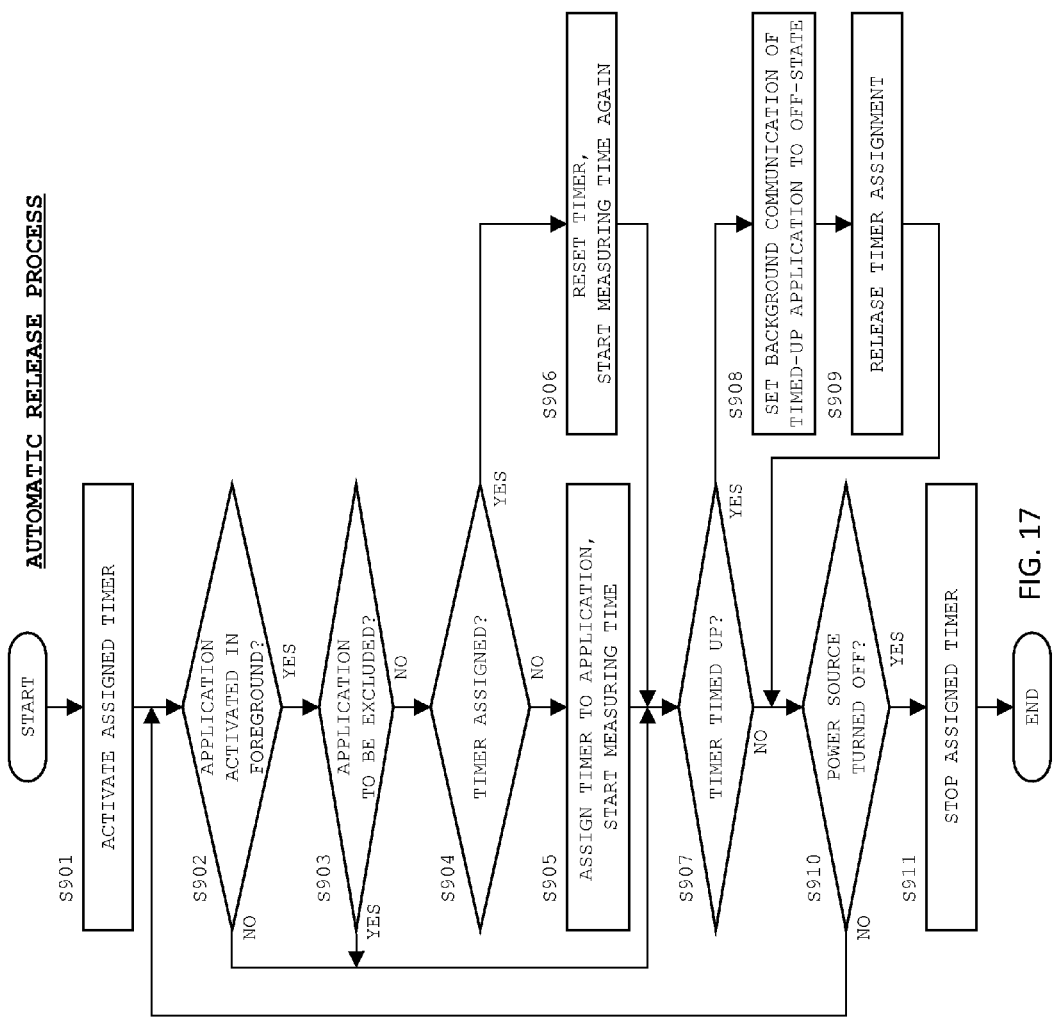
FIG. 17 is a flowchart showing an automatic release process of background communication according to the another modification.

FIG. 17 is a flowchart showing the automatic release process of background communication according to the present modification.

In the case where the power source of the mobile telephone 1 is brought to an on-state, and the mobile telephone 1 is activated, the control module 11 activates the timers assigned to the respective applications (S901). Subsequently, the control module 11 monitors whether one of the applications is activated in foreground (S902).

In the case where one of the applications is activated in foreground (S902: YES), when the application is not an application to be excluded (S903: NO), the control module 11 determines whether a timer has already been assigned to the application (S904).

In the case where a timer is not yet assigned to the application (S904: NO), the control module 11 assigns a timer to the application to cause the timer to start measuring a time (S905). In the case where a timer has already been assigned to the application (S904: YES), the control module 11 resets the timer, because the timer is operated, and the control module 11 causes the timer to start measuring a time again (S906).

The control module 11 (the determination module 21) determines whether one of the timers has timed up (S907). In the case where a predetermined period has elapsed in a state that one of the applications is not activated in foreground, the timer assigned to the application is timed up.

In the case where one of the timers has timed up (S907: YES), the control module 11 (the setting switching module 22) sets background communication of the application to which the timer is assigned to an off-state (S908). Further, the control module 11 releases timer assignment with respect to the application whose background communication is set to an off-state (S909).

During a time when the mobile telephone 1 is not operated to turn off the power source of the mobile telephone 1 (S910: NO), in other words, during a time when the mobile telephone 1 is operated, the processes from Step S902 to Step S909 are repeated. By performing the above operation, communication setting of background communication is switched from an on-state to an off-state with respect to an application which has not been activated in foreground for a predetermined period, and in which the assigned timer has timed up.

In the case where the mobile telephone 1 is operated to turnoff the power source of the mobile telephone 1 (S910: YES), the control module 11 stops the timer assigned to the application (S911). The measured time is stored in the timer. In the case where the mobile telephone 1 is activated again, the timer starts measuring a time again from the point of time when the timer has stopped measuring the time by the process of Step S901.

Also in the present modification, the automatic resume process as with the case of the automatic resume process shown in FIG. 4B is executed. In the case where the application whose background communication is set to an off-state is activated in foreground, background communication of the application is set to an on-state. In the present modification, however, the process of Step S204 of updating the latest activation date and time is not executed in the automatic resume process.

In the embodiment, in resuming background communication by start of charging the mobile telephone 1, the priority order of applications of which background communication is performed may be set. In this case, for instance, background communication of an application whose amount of communication is large may be prioritized. Alternatively, background communication of an application whose frequency of use is high may be prioritized. Alternatively, background communication of an application, of which communication setting of background communication is brought to an off-state most recently, may be prioritized. Any one of the above configurations is advantageous in efficiently performing intended background communication during a charging period of the mobile telephone 1.

The configurations of the first modification to the fifth modification may be combined, as necessary.

<Second Embodiment>

In the following, the second embodiment of the invention is described referring to the drawings.

A mobile telephone 1 according to the present embodiment includes a cabinet 2, a display surface 3, a microphone 4, a communication speaker 5, a key operation part 6, a power source key 7, and an external speaker 8 as shown in FIG. 1, as with the case of the first embodiment.

Figure 18:
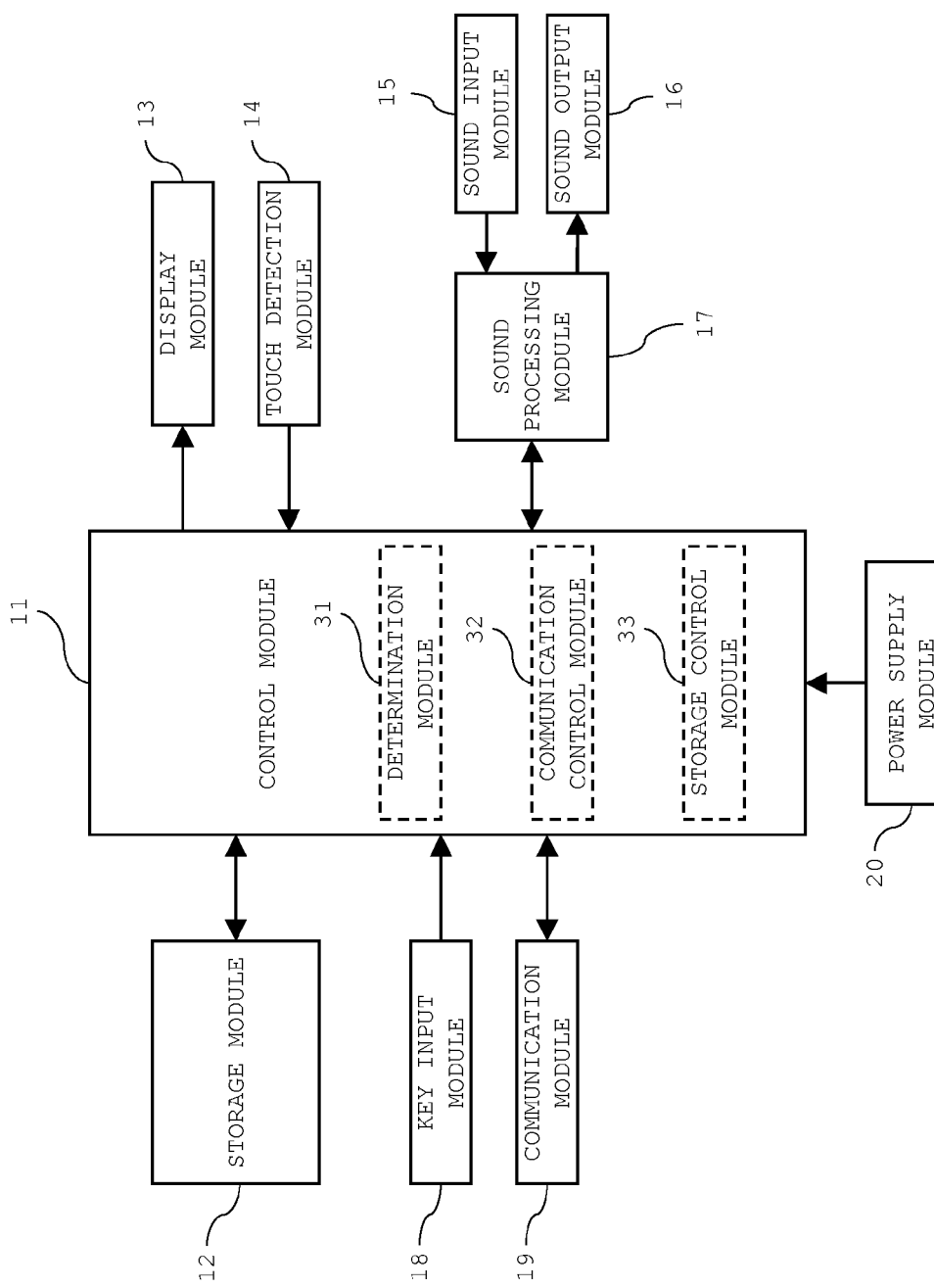
FIG. 18 is a block diagram showing an entire configuration of a mobile telephone according to a second embodiment.

FIG. 18 is a block diagram showing an entire configuration of the mobile telephone 1. The mobile telephone 1 includes a control module 11, a storage module 12, a display module 13, a touch detection module 14, a sound input module 15, a sound output module 16, a sound processing module 17, a key input module 18, a communication module 19, and a power supply module 20, as with the case of the first embodiment.

The mobile telephone 1 is capable of simultaneously executing a plurality of applications. An application to be operated is executed in foreground, and the execution screen (the operation screen) of the application is displayed on the display surface 3. The rest of the applications are executed in background without displaying the execution screens thereof on the display surface 3.

An application executed in background periodically communicates with the other device for data updating and the like, irrespective of a user operation with respect to an application executed in foreground.

Further, the mobile telephone 1 is capable of transmitting and receiving data to and from the other device by various near-field communication methods such as WiFi (registered trademark) and Bluetooth (registered trademark). The mobile telephone 1 is provided with an application for near-field communication with respect to each of the communication methods. In the following, to simplify the description, an application for near-field communication is called as a "communication application". Each of the communication applications is executed in background, and periodically performs communication for access point search, irrespective of a user operation with respect to an application executed in foreground.

An increase in the amount of communication in background (hereinafter, called as "background communication") results in an increase in electric power consumption of the battery.

In view of the above, in the present embodiment, communication restriction is automatically performed with respect to unnecessary background communication. Specifically, in the present embodiment, it is determined whether a predetermined condition for restricting background communication is satisfied for a predetermined period every predetermined cyclic period, more specifically, every day of a week or in each of the predetermined time zones. In the case where it is determined that the predetermined condition is satisfied, background communication for the predetermined period is restricted.

A communication restriction process is executed by the control module 11 shown in FIG. 18. Specifically, a function for communication restriction is given to the control module 11 by a program stored in the storage module 12, and the communication restriction process is executed by the function. To simplify the description, FIG. 18 shows the communication restriction function to be implemented by the control module 11 as a determination module 31, a communication control module 32, and a storage control module 33.

In the following, practical examples of the communication restriction process are described.

FIRST EXAMPLE

In the present example, a frequency of activation of an application in foreground on a certain day of a week in the past is determined with respect to each of the applications loaded in the mobile telephone 1 every day of the week. Then, background communication on the day of the week when the frequency of activation in foreground in the past is low is restricted with respect to each of the applications.

The storage module 12 stores therein an activation history database 12c and a communication setting table 12d for use in the communication restriction process.

FIG. 19A is a diagram showing a configuration of the activation history database 12c, and FIG. 19B is a diagram showing a configuration of the communication setting table 12d. The activation history database 12c stores therein a date and time (hereinafter, called as an "activation date and time") when each of the applications loaded in the mobile telephone 1 has been activated in foreground. The communication setting table 12d stores therein communication modes of background communication set by the communication restriction process with respect to each of the applications. The communication modes include a non-restriction mode at which background communication is not restricted, and a restriction mode at which background communication is restricted.

The determination module 31 determines a frequency of activation of each of the applications in foreground on a certain day of a week in the past every day of the week. For instance, the determination module 31 determines whether each of the applications has ever been activated in foreground on the same day of the week as the current day of the week for a predetermined period in the past (for instance, for three weeks), referring to the activation history database 12c.

The communication control module 32 restricts background communication of an application whose frequency of activation in foreground on a certain day of a week in the past is lower than a predetermined frequency, for instance, an application which has never been activated in foreground on a certain day of a week for a predetermined period in the past, every day of the week. For instance, the communication control module 32 inhibits execution of background communication of an application by setting the communication mode of the application to the restriction mode.

The storage control module 33 executes an activation date and time registration process, and registers the activation date and time of each of the applications in the activation history database 12c.

Figure 20:
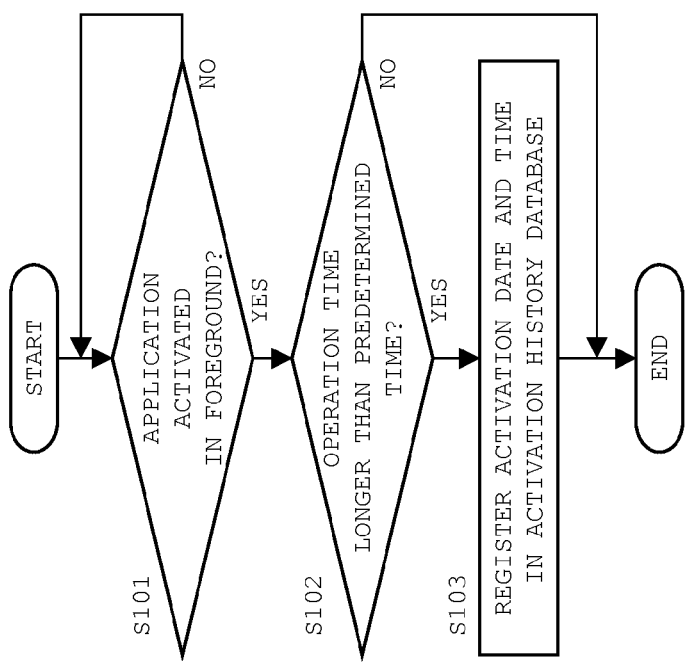
FIG. 20 is a flowchart showing an activation date and time registration process according to the first example.

FIG. 20 is a flowchart showing the activation date and time registration process. The activation date and time registration process is repeatedly executed during a time when the power source of the mobile telephone 1 is in an on-state.

The storage control module 33 determines whether one of the applications is activated in foreground (S101). For instance, in the case where an application in a finished state (in a non-activation state) is activated, the application is activated in foreground. Further, in the case where a predetermined operation is performed for activating an application executed in background in foreground, the application is activated in foreground.

In the case where one of the applications is activated in foreground (S101: YES), the storage control module 33 determines whether an operation time of the application in foreground is longer than a predetermined time (S102). In this example, the predetermined time is a reference time for judging whether the user has inadvertently activated an application, and is set to a short time such as several seconds, for instance, is set to five seconds.

In the case where the activated application is executed in foreground after an elapse of the predetermined time, the storage control module 33 determines that the operation time is longer than the predetermined time (S102: YES), and registers the activation date and time of the application in the activation history database 12c (S103).

On the other hand, in the case where the activated application is finished before the predetermined time is elapsed, or in the case where the application is shifted to background before the predetermined time is elapsed, the storage control module 33 determines that the operation time is shorter than the predetermined time (S102: NO), and is inoperative to register the activation date and time of the application in the activation history database 12c.

The above process makes it possible to prevent that inadvertent activation of an application by the user is reflected on determination as to whether background communication is to be restricted.

Figure 21:
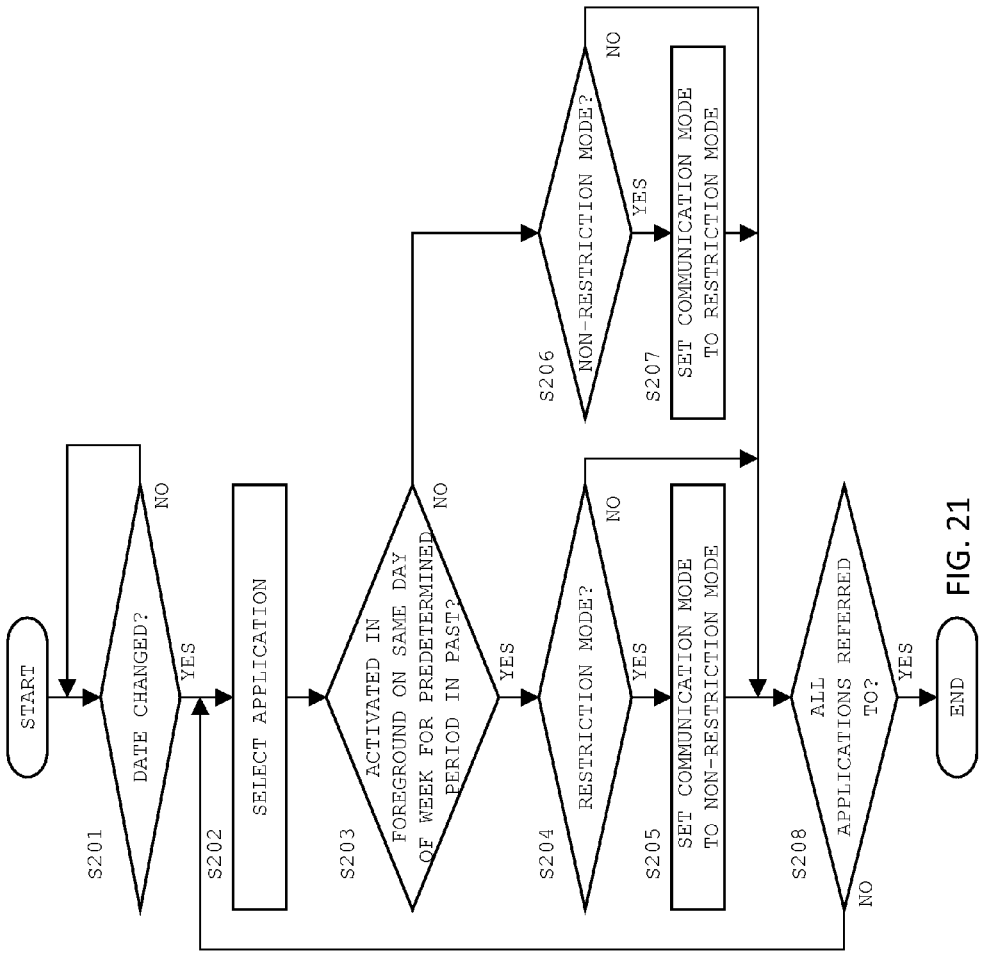
FIG. 21 is a flowchart showing a communication restriction process according to the first example.

FIG. 21 is a flowchart showing a communication restriction process. The communication restriction process is repeatedly executed during a time when the power source of the mobile telephone 1 is in an on-state.

The control module 11 monitors whether the date has changed (S201). In the case where the date has changed (S201: YES), the control module 11 selects an application to be referred to from the activation history database 12c (S202). The control module 11 (the determination module 31) determines whether the selected application has ever been executed in foreground on the same day of the week as the current day of the week for a predetermined period in the past, for instance, for three weeks in the past, referring to the activation history database 12c (S203).

In the case where the selected application has ever been executed in foreground on the same day of the week as the current day of the week for the predetermined period in the past (S203: YES), when the communication mode is set to the restriction mode (S204: YES), the control module 11 (the communication control module 32) sets the communication mode to the non-restriction mode (S205). In the case where the communication mode has already been set to the non-restriction mode (S204: NO), the non-restriction mode is maintained. "Non-restriction mode" is registered in the column of the communication mode of the selected application in the communication setting table 12d.

On the other hand, in the case where the selected application has never been executed in foreground on the same day of the week as the current day of the week for the predetermined period in the past (S203: NO), when the communication mode is set to the non-restriction mode (S206: YES), the control module 11 (the communication control module 32) sets the communication mode to the restriction mode (S207). In the case where the communication mode has already been set to the restriction mode (S206: NO), the restriction mode is maintained. "Restriction mode" is registered in the column of the communication mode of the selected application in the communication setting table 12d.

The control module 11 determines whether all the applications registered in the activation history database 12c have been referred to (S208). In the case where the control module 11 determines that all the applications have not been referred to (S208: NO), the control module 11 returns to the process of Step S202, and selects an application to be referred to next. The control module 11 executes the processes from Step S203 to Step S207 with respect to the selected application. In the case where the control module 11 has referred to all the applications (S208: YES), the process is ended.

As described above, setting of the communication mode on the day is completed with respect to all the applications by executing the communication restriction process. The communication control module 32 performs background communication when the background communication timing has come on the day with respect to the application whose communication mode is set to the non-restriction mode, referring to the communication setting table 12d. On the other hand, the communication control module 32 is inoperative to perform background communication with respect to the application whose communication mode is set to the restriction mode, regardless of whether the background communication timing has come on the day.

Communication mode is set with respect to all the applications each time the date is changed, in other words, every day of the week, and background communication is performed based on the set communication mode.

FIG. 22 is a diagram exemplifying an execution state of background communication of a certain application in a certain week.

There is a case that the frequency of use of a certain application is high on a specific day of a week, because of various use states of the user. For instance, there is a case that the user registers a schedule on a specific day of a week, with use of a scheduling application.

For instance, as shown in FIG. 22, in the case where the frequency of use of a certain application is high on Wednesday and Sunday, and is low on the other days of a week, executing the communication restriction process of the present example makes it possible to perform background communication of the application on Wednesday and Sunday for data updating and the like, and makes it possible not to perform background communication on the days of the week other than Wednesday and Sunday.

As described above, according to the present example, background communication of an application is not performed on the day of the week when the possibility of using the application is low with respect to each of the applications. Thus, the above configuration is advantageous in suppressing electric power consumption of the battery by unnecessary execution of background communication.

<First Modification of First Example>

In the first example, in the case where the restriction mode is set, background communication is not performed. As shown in the present modification, however, partial restriction may be performed, in place of complete restriction as described above. For instance, the communication control module 32 may lower the frequency of background communication.

For instance, a communication process may be performed such that background communication of one of transmission and receiving is performed, and background communication of the other of transmission and receiving is not performed. FIG. 23A is a flowchart showing a communication process of restricting one of transmission and receiving.

When the background communication start timing has come (S301: YES), the communication control module 32 determines whether background communication relates to data transmission and the like, or background communication relates to data receiving and the like (S302). In the case where background communication relates to transmission (S302: transmission), the communication control module 32 starts background communication (S303). On the other hand, in the case where background communication relates to receiving (S302: receiving), the communication control module 32 stops background communication (S304). Contrary to the communication process shown in FIG. 23A, the communication control module 32 may stop background communication in the case where background communication relates to transmission, and may start background communication in the case where background communication relates to receiving.

Further, a communication process of starting or stopping background communication may be performed depending on a time zone. FIG. 23B is a flowchart showing a communication process of restricting background communication depending on a time zone.

When the background communication start timing has come (S311: YES), the communication control module 32 determines whether the current point of time is in a time zone of an odd number time (S312). In the case where the current point of time is in a time zone of an odd number time (S312: YES), the communication control module 32 starts background communication (S313). On the other hand, in the case where the current point of time is in a time zone of an even number time (S312: NO), the communication control module 32 stops background communication (S314). Contrary to the communication process shown in FIG. 23B, in the case where the current point of time is in a time zone of an odd number time, the communication control module 32 may stop background communication, and in the case where the current point of time is in a time zone of an even number time, the communication control module 32 may start background communication.

Further, a communication process of starting or stopping background communication may be performed depending on a lit state of the display module 13. FIG. 24A is a flowchart showing a communication process of restricting background communication depending on a lit state of the display module 13.

When the background communication start timing has come (S321: YES), the communication control module 32 determines whether the display module 13 is lit (S322).

The display module 13 is extinguished in the case where an operation of the mobile telephone 1 has not been performed for a predetermined time. Therefore, in the case where the display module 13 is lit, the user is using the mobile telephone 1, and an application may be used.

In the case where the display module 13 is lit (S322: YES), the communication control module 32 starts background communication (S323). On the other hand, in the case where the display module 13 is extinguished (S322: NO), the communication control module 32 stops background communication (S324).

Further, a communication process of starting or stopping background communication may be performed depending on an elapse of time after the mobile telephone 1 has been operated. FIG. 24B is a flowchart showing a communication process of restricting background communication depending on an elapse of time after the mobile telephone 1 has been operated.

When the background communication start timing has come (S331: YES), the communication control module 32 determines whether the time is within a predetermined time after the mobile telephone 1 has been operated (S332).

In the case where the time is shortly after the mobile telephone 1 has been operated, the user may continue to use the mobile telephone 1, and an application may be used.

In the case where the time is within a predetermined time after the mobile telephone 1 has been operated (S332: YES), the communication control module 32 starts background communication (S333). On the other hand, in the case where the time exceeds the predetermined time after the mobile telephone 1 has been operated (5332: NO), the communication control module 32 stops background communication (S334).

<Second Modification of First Example>

In the first example, a frequency of activation of an application in foreground on a certain day of a week in the past is determined with respect to each of the applications, and the communication mode of the application is set to the non-restriction mode or to the restriction mode every day of the week, based on a result of the determination.

In the present modification, it is determined whether a period (hereinafter, called as a "non-activation period") when an application has not been activated in foreground exceeds a predetermined number of days, in addition to the aforementioned determination condition. In the present modification, the communication mode is set to a non-restriction mode, a first restriction mode, or a second restriction mode, based on the aforementioned two determination conditions. The first restriction mode is a communication mode at which the partial restriction is performed, and the second communication mode is a communication mode at which the complete restriction is performed.

Figure 25:
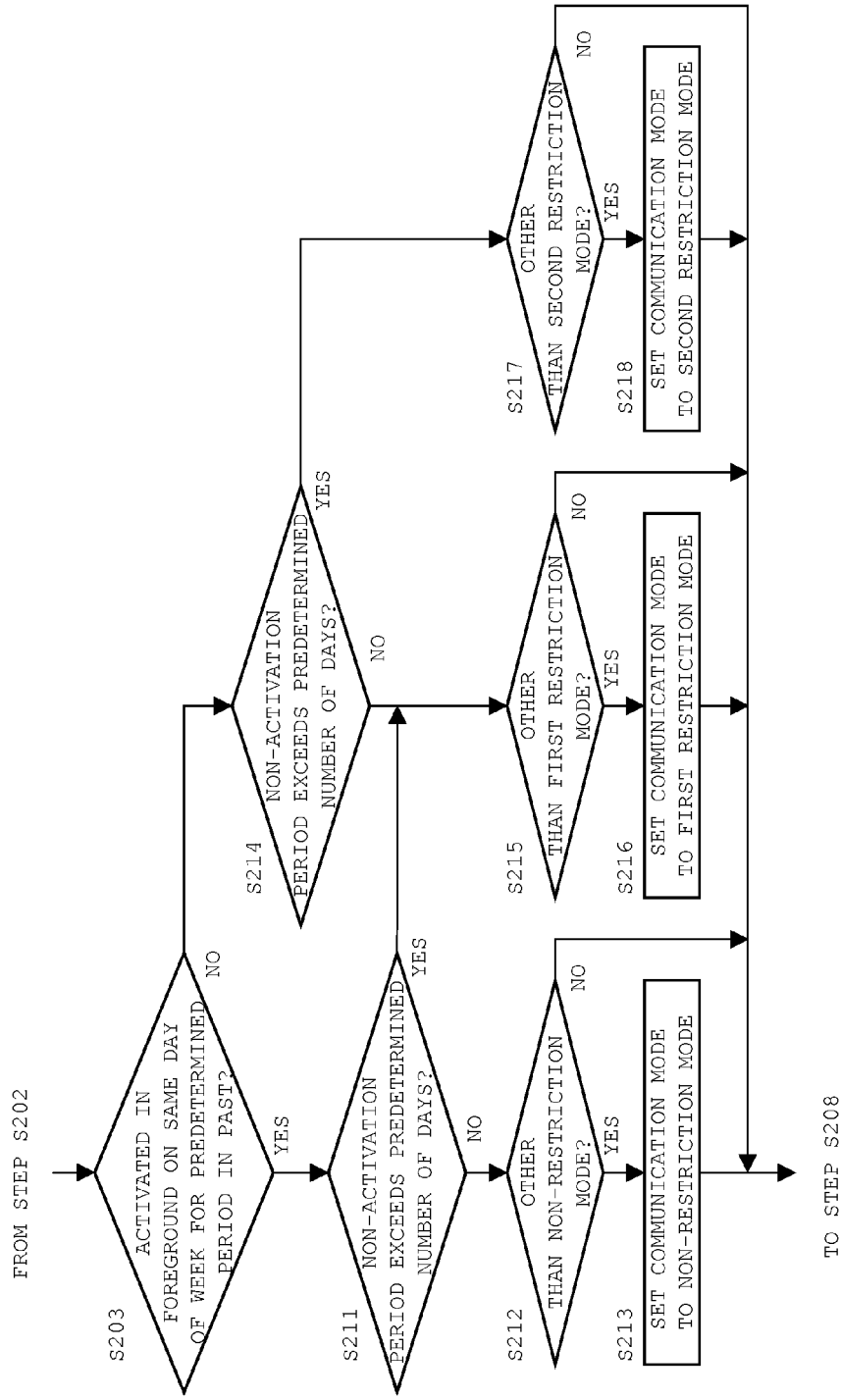
FIG. 25 is a flowchart showing a communication restriction process according to a second modification of the first example.

FIG. 25 is a flowchart showing a communication restriction process. In the communication restriction process of the present modification, the processes from Step S204 to Step S207 in the communication restriction process in the first example shown in FIG. 21 are replaced by the processes from Step S211 to Step S218. Referring to FIG. 25, the illustration of Step S201, Step S202, and Step S208 is omitted.

In the case where a selected application has ever been executed in foreground on the same day of the week as the current day of the week for the predetermined period in the past (S203: YES), the control module 11 (the determination module 31) determines whether the non-activation period exceeds a predetermined number of days (for instance, seven days) (S211). In the case where the non-activation period does not exceed the predetermined number of days (S211: NO), the control module 11 (the communication control module 32) sets the communication mode other than the non-restriction mode to the non-restriction mode (S212: YES→S213). On the other hand, in the case where the non-activation period exceeds the predetermined number of days (S211: YES), the control module 11 (the communication control module 32) sets the communication mode other than the first restriction mode to the first restriction mode (S215: YES→S216).

In the case where the selected application has never been executed in foreground on the same day of the week as the current day of the week for the predetermined period in the past (S203: NO), the control module 11 (the determination module 31) determines whether the non-activation period exceeds the predetermined number of days (S214). In the case where the non-activation period does not exceed the predetermined number of days (S214: NO), the control module 11 (the communication control module 32) sets the communication mode other than the first restriction mode to the first restriction mode (S215: YES→S216). On the other hand, in the case where the non-activation period exceeds the predetermined number of days (S214: YES), the control module 11 (the communication control module 32) sets the communication mode other than the second restriction mode to the second restriction mode (S217: YES→S218).

According to the present modification, a frequency of activation of an application in foreground on a certain day of a week, and a period when the application has not been activated in foreground are determined every day of the week, and background communication is finely restricted based on a result of the determination. This is more advantageous in suppressing electric power consumption by background communication.

SECOND EXAMPLE

In the present example, one day is divided into time zones each having one hour, or into time zones each having several hours. In the present example, for instance, one day is divided into time zones each having four hours. In this case, one day is divided into six time zones i.e. a time zone from 12:00 AM to 4:00 AM, a time zone from 4:00 AM to 8:00 AM, a time zone from 8:00 AM to 12:00 PM, a time zone from 12:00 PM to 4:00 PM, a time zone from 4:00 PM to 8:00 PM, and a time zone from 8:00 PM to 12:00 AM.

In the present example, there is determined a frequency of activation of each of the applications in foreground in a certain time zone in the past with respect to each of the applications loaded in the mobile telephone 1, in each of the time zones. Then, background communication is restricted in the same time zone as the time zone in the past when the frequency of activation in foreground is low with respect to each of the applications.

Also in the present example, the activation history database 12c shown in FIG. 19A and the communication setting table 12d shown in FIG. 19B are used.

The determination module 31 determines a frequency of activation of each of the applications in foreground in a certain time zone in the past in each of the time zones. For instance, the determination module 31 determines whether an applications has ever been activated in foreground in the same time zone as the current time zone for a predetermined period in the past (for instance, for three days) with respect to each of the applications, referring to the activation history database 12c.

The communication control module 32 restricts background communication of an application, whose frequency of activation in foreground in a certain time zone in the past is lower than a predetermined frequency, for instance, an application which has never been activated in foreground in a certain time zone for a predetermined period in the past, in each of the time zones.

Figure 26:
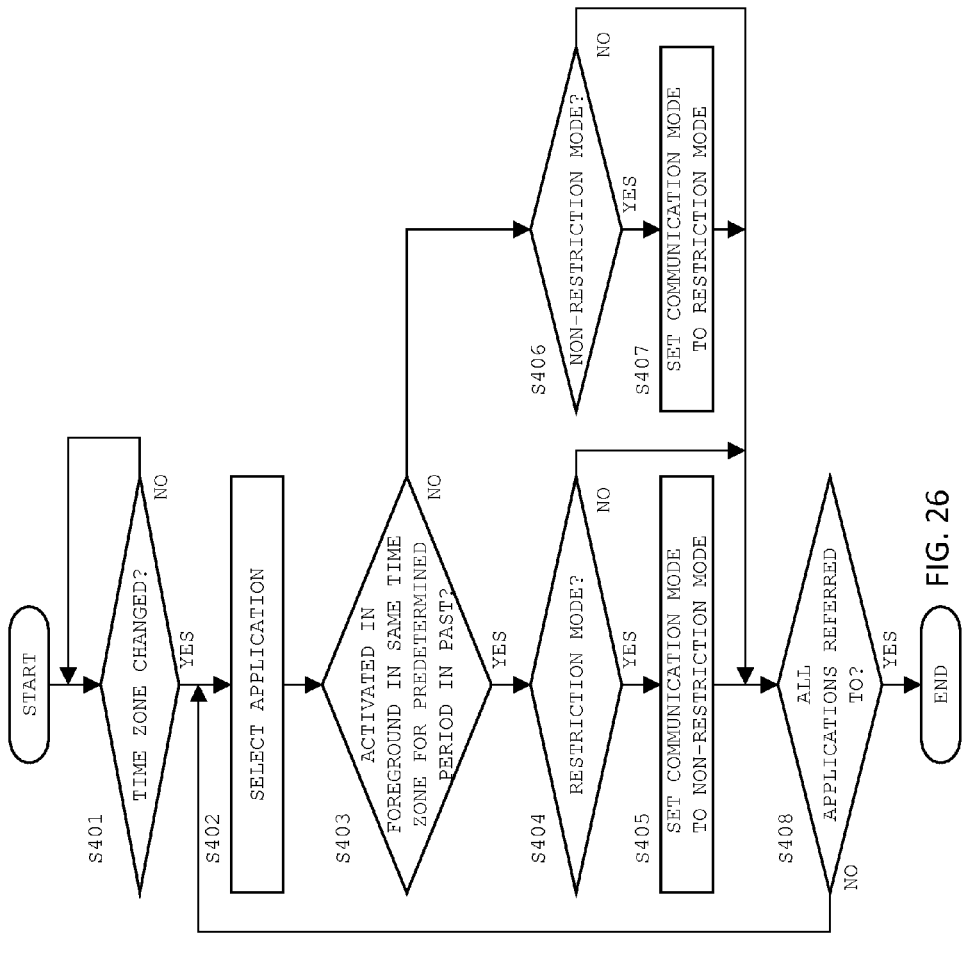
FIG. 26 is a flowchart showing a communication restriction process according to a second example of the second embodiment.

FIG. 26 is a flowchart showing a communication restriction process. The communication restriction process is repeatedly executed during a time when the power source of the mobile telephone 1 is in an on-state.

The control module 11 monitors whether the time zone has changed (S401). In the case where the time zone has changed (S401: YES), the control module 11 selects an application to be referred to from the activation history database 12c (S402). The control module 11 (the determination module 31) determines whether the selected application has ever been executed in foreground in the same time zone as the current time zone for a predetermined period in the past, for instance, for three days in the past, referring to the activation history database 12c (S403).

In the case where the selected application has ever been executed in foreground in the same time zone as the current time zone for the predetermined period in the past (S403: YES), when the communication mode is set to the restriction mode (S404: YES), the control module 11 (the communication control module 32) sets the communication mode to the non-restriction mode (S405). In the case where the communication mode has already been set to the non-restriction mode (S404: NO), the non-restriction mode is maintained.

On the other hand, in the case where the selected application has never been executed in foreground in the same time zone as the current time zone for the predetermined period in the past (S403: NO), when the communication mode is set to the non-restriction mode (S406: YES), the control module 11 (the communication control module 32) sets the communication mode to the restriction mode (S407). In the case where the communication mode has already been set to the restriction mode (S406: NO), the restriction mode is maintained.

In the case where the control module 11 determines that all the applications have not been referred to (S408: NO), the control module 11 returns to the process of Step S402, and selects an application to be referred to next. The control module 11 executes the processes from Step S403 to Step S407 with respect to the selected application. In the case where the control module 11 has referred to all the applications (S408: YES), the process is ended.

As described above, setting of the communication mode in the time zone is completed with respect to all the applications by executing the communication restriction process. The communication control module 32 performs background communication of the application whose communication mode is set to the non-restriction mode when the background communication timing has come in the time zone, referring to the communication setting table 12d. On the other hand, the communication control module 32 is inoperative to perform background communication of the application whose communication mode is set to the restriction mode, regardless of whether the background communication timing has come in the time zone.

Communication mode is set with respect to all the applications each time the time zone is changed, in other words, in each of the time zones, and background communication is performed based on the set communication mode.

FIG. 27 is a diagram exemplifying an execution state of background communication of a certain application on a certain day.

As with the case of the days of the week, there is a case that the frequency of use of a certain application is high in a specific time zone of a day, because of various use states of the user. For instance, there is a case that the user checks electronic mails at a specific point of time, with use of an electronic mail application.

For instance, as shown in FIG. 27, in the case where the frequency of use of a certain application is high in a time zone from 12:00 PM to 4:00 PM and in a time zone from 8:00 PM to 12:00 AM, and is low in the other time zones, executing the communication restriction process of the present example makes it possible to perform background communication of the application in the time zone from 12:00 PM to 4:00 PM and in the time zone from 8:00 PM to 12:00 AM for data updating and the like, and makes it possible not to perform background communication in the time zones other than the above time zones.

As described above, according to the present example, background communication of an application is not performed in a time zone when the possibility of using the application is low with respect to each of the applications. Thus, the above configuration is advantageous in suppressing electric power consumption of the battery by unnecessary execution of background communication.

THIRD EXAMPLE

In the present example, there is determined a frequency of connection with the other device by each of the near-field communication methods on a certain day of a week in the past with respect to each of the near-field communication methods every day of the week. Background communication for access point search is restricted on the day of the week when the frequency of connection with the other device by each of the communication methods is low with respect to a communication application corresponding to each of the communication methods.

The storage module 12 stores therein a connection history database 12e and a communication setting table 12f for use in a communication restriction process.

FIG. 28A is a diagram showing a configuration of the connection history database 12e, and FIG. 28B is a diagram showing a configuration of the communication setting table 12f. The connection history database 12e stores therein a date and time (hereinafter, called as a "connection date and time") when communication connection with the other device has been performed by each of the communication methods with respect to each of the communication methods. The communication setting table 12f stores therein a search interval set by the communication restriction process with respect to a communication application corresponding to each of the communication methods. In the present example, a first time (for instance, five seconds), and a second time (for instance, one minute) longer than the first time are set as the search interval.

The determination module 31 determines a frequency of connection with the other device by each of the communication methods on a certain day of a week in the past every day of the week. For instance, the determination module 31 determines whether communication connection with the other device has ever been performed on the same day of the week as the current day of the week for a predetermined period in the past (for instance, for three weeks) every day of the week with respect to each of the communication method, referring to the connection history database 12e.

The communication control module 32 restricts background communication of a communication application corresponding to a communication method, whose frequency of connection with the other device on a certain day of a week in the past is lower than a predetermined frequency, for instance, a communication application corresponding to a communication method, by which communication connection with the other device has never been executed on a certain day of a week in the past, every day of the week. For instance, the communication control module 32 lowers the frequency of background communication for search of a communication application by setting the search interval of the communication application to the second time.

The storage control module 33 executes a connection date and time registration process, and registers the connection date and time of each of the communication methods in the connection history database 12e.

Figure 29:
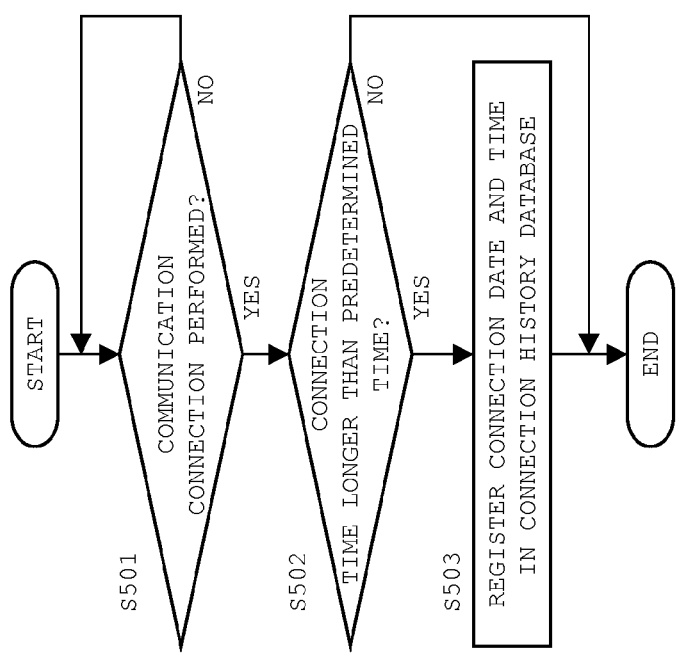
FIG. 29 is a flowchart showing a connection date and time registration process according to the third example.

FIG. 29 is a flowchart showing the connection date and time registration process. The connection date and time registration process is repeatedly executed during a time when the power source of the mobile telephone 1 is in an on-state.

In the case where communication connection with the other device is performed by one of the communication methods (S501: YES), the storage control module 33 determines whether the connection time by the communication connection is longer than a predetermined time (S502). In this example, the predetermined time is a reference time for judging whether the user has inadvertently performed communication connection, and is set to a short time such as several seconds, for instance, is set to five seconds.

In the case where communication connection is continued after an elapse of the predetermined time, the storage control module 33 determines that the connection time is longer than the predetermined time (S502: YES), and registers the connection date and time by the communication method in the connection history database 12e (S503).

On the other hand, in the case where the communication connection is blocked before the predetermined time is elapsed, the storage control module 33 determines that the connection time is shorter than the predetermined time (S502: NO), and is inoperative to register the connection date and time by the communication method in the connection history database 12e. The above process makes it possible to prevent that inadvertent communication connection by the user is reflected on determination as to whether background communication is to be restricted.

Figure 30:
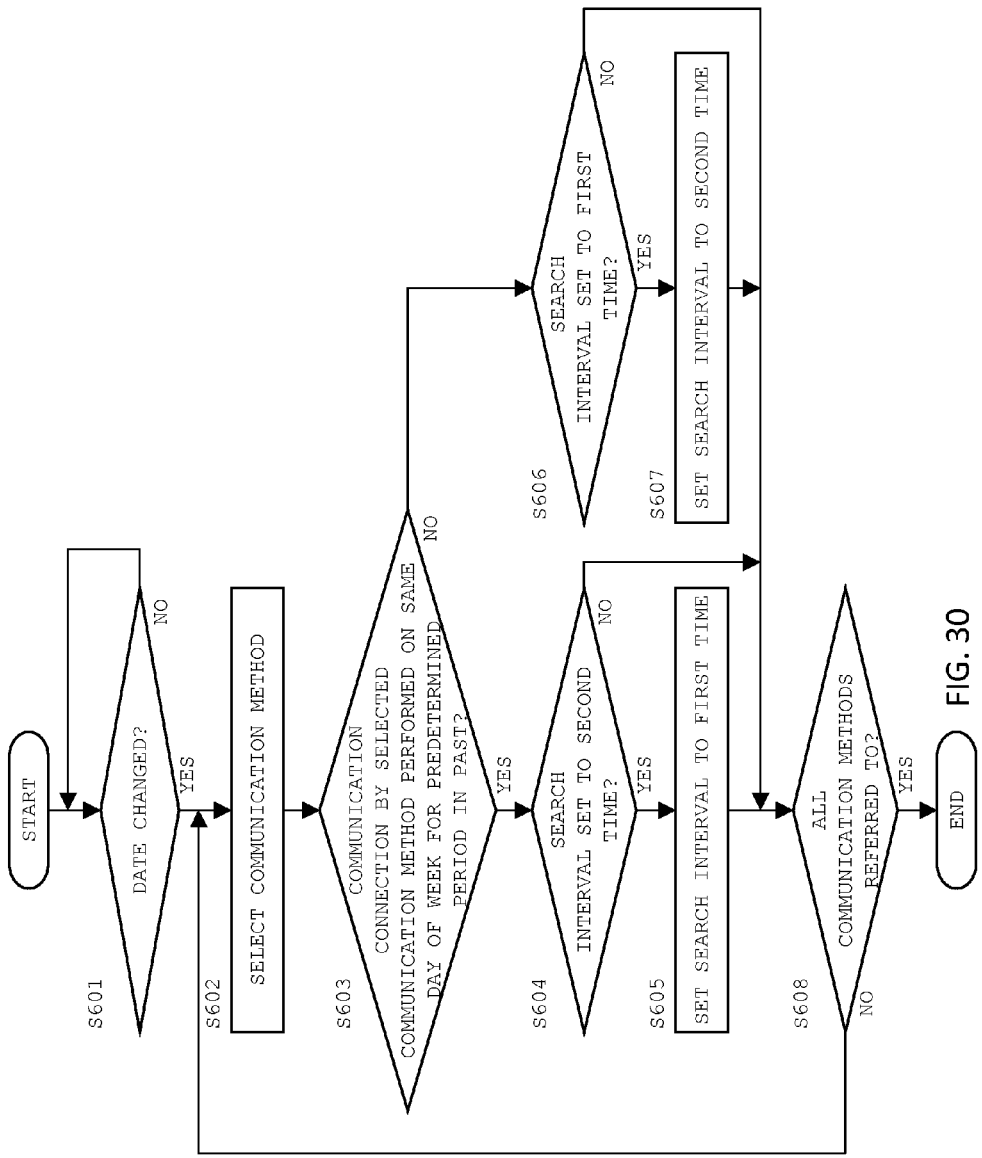
FIG. 30 is a flowchart showing a communication restriction process according to the third example.

FIG. 30 is a flowchart showing a communication restriction process. The communication restriction process is repeatedly executed during a time when the power source of the mobile telephone 1 is in an on-state.

The control module 11 monitors whether the date has changed (S601). In the case where the date has changed (S601: YES), the control module 11 selects a communication method to be referred to from the connection history database 12e (S602). The control module 11 (the determination module 31) determines whether communication connection with the other device by the selected communication method has ever been performed on the same day of the week as the current day of the week for a predetermined period in the past, for instance, for three weeks in the past, referring to the connection history database 12e (S603).

In the case where communication connection with the other device by the selected communication method has ever been performed on the same day of the week as the current day of the week for the predetermined period in the past (S603: YES), when the search interval of the communication application corresponding to the selected communication method is set to the second time (S604: YES), the control module 11 (the communication control module 32) sets the search interval to the first time (S605). In the case where the search interval has already been set to the first time (S604: NO), the first time is maintained. "First time" is registered in the column of the search interval of the communication application corresponding to the selected communication method in the communication setting table 12f.

On the other hand, in the case where communication connection with the other device by the selected communication method has never been performed on the same day of the week as the current day of the week for the predetermined period in the past (S603: NO), when the search interval is set to the first time (S606: YES), the control module 11 (the communication control module 32) sets the search interval to the second time (S607). In the case where the search interval has already been set to the second time (S606: NO), the second time is maintained. "Second time" is registered in the column of the search interval of the communication application corresponding to the selected communication method in the communication setting table 12f.

The control module 11 determines whether all the communication methods registered in the connection history database 12e have been referred to (S608). In the case where the control module 11 determines that all the communication methods have not been referred to (S608: NO), the control module returns to the process of Step S602, and selects a communication method to be referred to next. The control module 11 executes the processes from Step S603 to Step S607 with respect to the selected communication method. In the case where the control module 11 has referred to all the communication methods (S608: YES), the process is ended.

As described above, setting of the search interval on the day is completed with respect to communication applications corresponding to all the communication methods by executing the communication restriction process. The communication control module 32 performs background communication for access point search in accordance with the set search interval, referring to the communication setting table 12f. In the case where the search interval is set to the first time, the communication control module 32 performs background communication for search at the interval of the first time. On the other hand, in the case where the search interval is set to the second time, the communication control module 32 performs background communication for search at the interval of the second time.

A search interval is set with respect to all the near-field communication methods each time the date is changed, in other words, every day of a week, and background communication for search is performed at the set search interval.

As described above, according to the present example, access point search is performed at a long search interval by a communication application corresponding to a near-field communication method on the day of the week when the frequency of connection in the past is low, and the possibility of communication connection by the near-field communication method is low with respect to each of the near-field communication methods. Thus, the above configuration is advantageous in suppressing electric power consumption of the battery by unnecessary execution of background communication for search.

In the present example, in the case where communication connection with the other device by a certain communication method has never been performed for a predetermined period in the past, specifically, in the case where the connection frequency by the communication method is low, the search interval of the communication application corresponding to the communication method is set to be long. However, background communication for search may not be performed, in place of setting the search interval to be long.

<Modification of Third Example>

In the present example, a frequency of connection with the other device on a certain day of a week in the past by a communication method is determined with respect to each of the commination methods, and a search interval of the communication application corresponding to the communication method is set to the first time or to the second time every day of the week, based on a result of the determination.

In the present modification, it is determined whether a period (hereinafter, called as a "non-connection period") when communication connection with the other device by each of the communication methods exceeds a predetermined number of days, in addition to the aforementioned determination condition. In the present modification, setting of the search interval to a first time, setting of the search interval to a second time, and setting of stopping the search are performed, based on the aforementioned two determination conditions. In the case where setting of stopping the search is performed, the communication control module 32 is inoperative to perform background communication for search.

Figure 31:
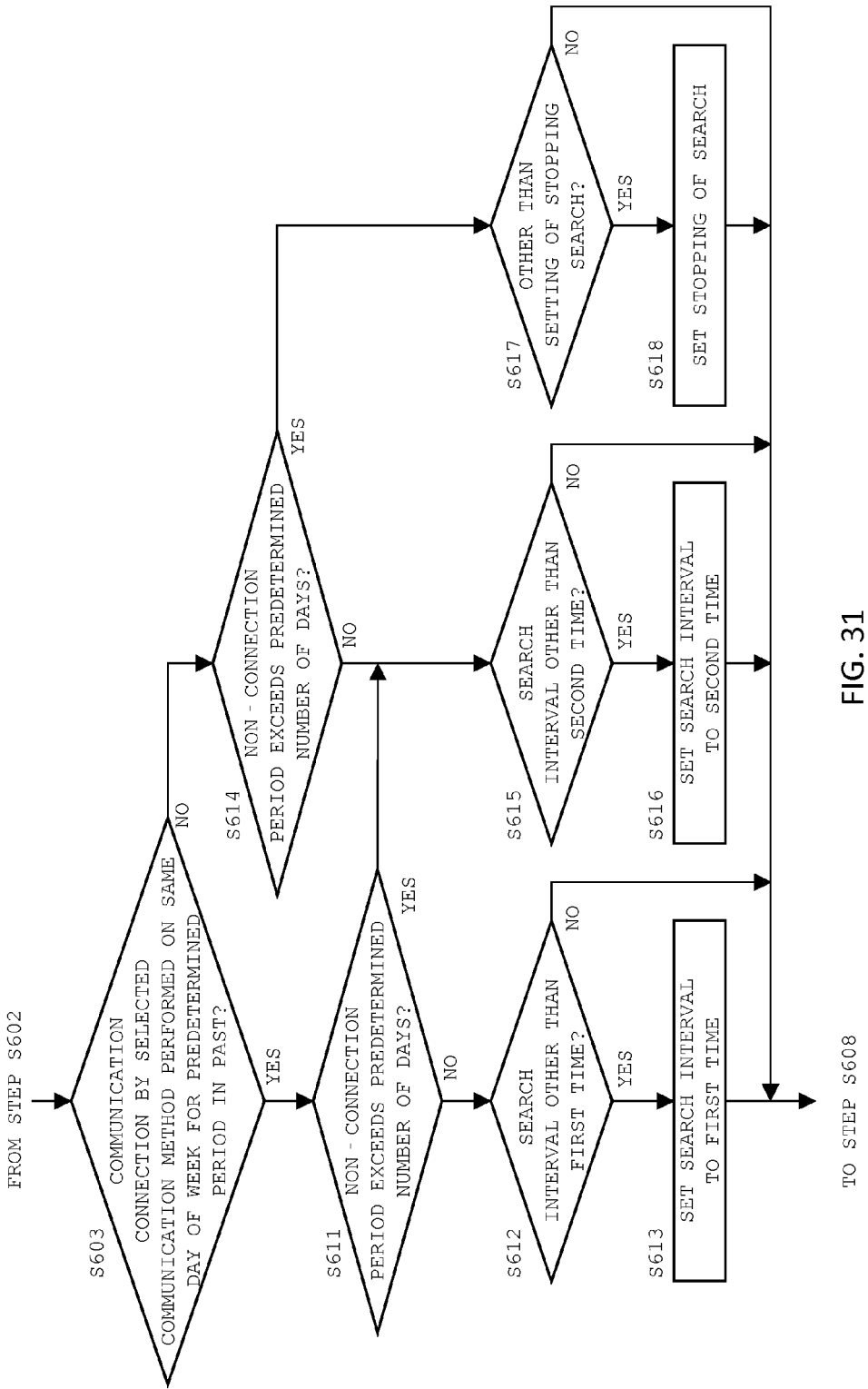
FIG. 31 is a flowchart showing a communication restriction process according to a modification of the third example.

FIG. 31 is a flowchart showing a communication restriction process. In the communication restriction process of the present modification, the processes from Step S604 to Step S607 in the communication restriction process in the third example shown in FIG. 30 are replaced by the processes from Step S611 to Step S618. Referring to FIG. 31, the illustration of Step S601, Step S602, and Step S608 is omitted.

In the case where communication connection with the other device by a selected communication method has ever been performed on the same day of the week as the current day of the week for the predetermined period in the past (S603: YES), the control module 11 (the determination module 31) determines whether the non-connection period exceeds a predetermined number of days (for instance, seven days) (S611). In the case where the non-connection period does not exceed the predetermined number of days (S611: NO), the control module 11 (the communication control module 32) sets the search interval other than the first time to the first time (S612: YES→S613). On the other hand, in the case where the non-connection period exceeds the predetermined number of days (S611: YES), the control module 11 (the communication control module 32) sets the search interval other than the second time to the second time (S615: YES→S616).

In the case where communication connection with the other device by the selected communication method has never been performed on the same day of the week as the current day of the week for the predetermined period in the past (S603: NO), the control module 11 (the determination module 31) determines whether the non-connection period exceeds the predetermined number of days (S614). In the case where the non-connection period does not exceed the predetermined number of days (S614: NO), the control module 11 (the communication control module 32) sets the search interval other than the second time to the second time (S615: YES→S616). On the other hand, in the case where the non-connection period exceeds the predetermined number of days (S614: YES), the control module 11 (the communication control module 32) sets the setting other than the setting of stopping the search to the setting of stopping the search (S617: YES→S618).

According to the present modification, a frequency of connection with the other device by each of the communication methods, and a period when communication connection with the other device by each of the communication methods are determined on a certain day of a week every day of the week, and background communication for search is finely restricted with respect to a communication application corresponding to each of the communication methods, based on a result of the determination. This is more advantageous in suppressing electric power consumption by background communication.

Regarding communication connection with the other device by a communication method in which search is stopped, it is possible to resume communication connection by a user operation and the like. For instance, in response to receiving, by the touch detection module 14, a user operation onto an icon indicative of switching on and off of communication connection displayed on a home screen, the control module 11 (the communication control module 32) resumes communication connection with the other device by the communication method corresponding to the icon.

FOURTH EXAMPLE

In the present example, as with the case of the second example, one day is divided into time zones each having one hour, or into time zones each having several hours. In the present example, as with the case of the second example, for instance, one day is divided into time zones each having four hours, specifically, six time zones i.e. a time zone from 12:00 AM to 4:00 AM, a time zone from 4:00 AM to 8:00 AM, a time zone from 8:00 AM to 12:00 PM, a time zone from 12:00 PM to 4:00 PM, a time zone from 4:00 PM to 8:00 PM, and a time zone from 8:00 PM to 12:00 AM.

In the present example, there is determined a frequency of connection with the other device by each of the communication methods in a certain time zone in the past with respect to each of the near-field communication methods in each of the time zones. Then, background communication for access point search is restricted in a time zone when the frequency of connection with the other device by each of the communication methods is low with respect to a communication application corresponding to each of the communication methods.

Also in the present example, the connection history database 12e shown in FIG. 28A and the communication setting table 12f shown in FIG. 28B are used.

The determination module 31 determines a frequency of connection with the other device by each of the communication methods in a certain time zone in the past in each of the time zones. For instance, the determination module 31 determines whether communication connection with the other device has ever been performed in the same time zone as the current time zone for a predetermined period in the past (for instance, for three days) in each of the time zones with respect to each of the communication methods, referring to the connection history database 12e.

The communication control module 32 restricts background communication of a communication application corresponding to a communication method, whose frequency of connection with the other device in a certain time zone in the past is lower than a predetermined frequency, for instance, a communication application corresponding to a communication method, by which communication connection with the other device has never been performed in a certain time zone, in each of the time zones.

Figure 32:
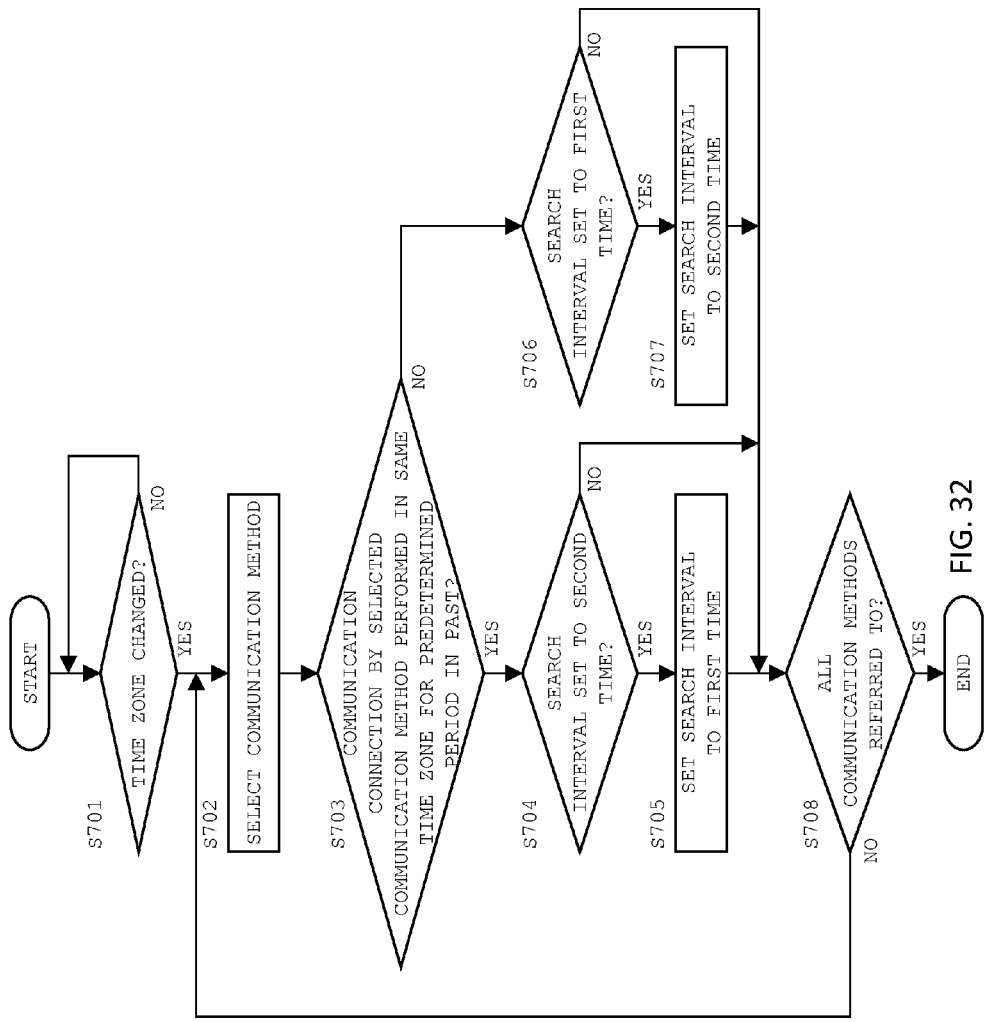
FIG. 32 is a flowchart showing a communication restriction process according to a fourth example of the second embodiment.

FIG. 32 is a flowchart showing a communication restriction process. The communication restriction process is repeatedly executed during a time when the power source of the mobile telephone 1 is in an on-state.

The control module 11 monitors whether the time zone has changed (S701). In the case where the time zone has changed (S701: YES), the control module 11 selects a communication method to be referred to from the connection history database 12e (S702). The control module 11 (the determination module 31) determines whether communication connection with the other device by the selected application has ever been performed in the same time zone as the current time zone for a predetermined period in the past, for instance, for three days in the past, referring to the connection history database 12e (S703).

In the case where communication connection with the other device by the selected application has ever been performed in the same time zone as the current time zone for the predetermined period in the past (S703: YES), when the search interval of the communication application corresponding to the selected communication method is set to the second time (S704: YES), the control module 11 (the communication control module 32) sets the search interval to the first time (S705). In the case where the search interval has already been set to the first time (S704: NO), the first time is maintained.

On the other hand, in the case where communication connection with the other device by the selected communication method has never been performed in the same time zone as the current time zone for the predetermined period in the past (S703: NO), when the search interval is set to the first time (S706: YES), the control module 11 (the communication control module 32) sets the search interval to the second time (S707). In the case where the search interval has already been set to the second time (S706: NO), the second time is maintained.

In the case where the control module 11 determines that all the communication methods have not been referred to (S708: NO), the control module 11 returns to the process of Step S702, and selects a communication method to be referred to next. The control module 11 executes the processes from Step S703 to Step S707 with respect to the selected communication method. In the case where the control module 11 has referred to all the communication methods (S708: YES), the process is ended.

As described above, setting of the search interval in the time zone is completed with respect to the communication applications corresponding to all the communication methods by executing the communication restriction process. The communication control module 32 performs background communication for access point search in accordance with the set search interval, referring to the communication setting table 12f. In the case where the search interval is set to the first time, the communication control module 32 performs background communication for search at the interval of the first time. On the other hand, in the case where the search interval is set to the second time, the communication control module 32 performs background communication for search at the interval of the second time.

A search interval is set with respect to all the near-field communication methods each time the time zone is changed, in other words, in each of the time zones, and background communication for search is performed at the set search interval.

As described above, according to the present example, access point search is performed at a long search interval by a communication application corresponding to a near-field communication method in a time zone when the frequency of connection in the past is low, and the possibility of communication connection by the near-field communication method is low with respect to each of the near-field communication methods. Thus, the above configuration is advantageous in suppressing electric power consumption of the battery by unnecessary execution of background communication for search.

In the present example, as with the case of the third example, in the case where communication connection with the other device by a certain communication method has never been performed for a predetermined period in the past, background communication for search may not be performed, in place of setting the search interval to be long.

<Other Modification of Second Embodiment>

In the foregoing, the embodiment and the modifications of the embodiment are described. The invention is not limited by the embodiment and the like. Further, the embodiment of the invention may be modified in various ways other than the above.

For instance, in the first example, as an example of determination on a frequency of activation of an application in foreground every day of a week, it is determined whether an application has ever been activated in foreground on the same day of the week as the current day of the week for a predetermined period in the past. Alternatively, it may be determined whether the number of times of activation of an application in foreground on the same day of the week as the current day of the week for a predetermined period in the past is not smaller than a predetermined plural number of times.

Similarly to the above, also in the second example, it may be determined whether the number of times of activation of an application in foreground in the same time zone as the current time zone for a predetermined period in the past is not smaller than a predetermined plural number of times. Further, also in the third example, it may be determined whether the number of times of communication connection with the other device by a communication method on the same day of the week as the current day of the week for a predetermined period in the past is not smaller than a predetermined plural number of times. Further, also in the fourth example, it may be determined whether the number of times of communication connection with the other device by a communication method in the same time zone as the current time zone for a predetermined period in the past is not smaller than a predetermined plural number of times.

Further, an application of which the user does not intend to automatically restrict background communication may be set as an application to be excluded.

Figure 33:
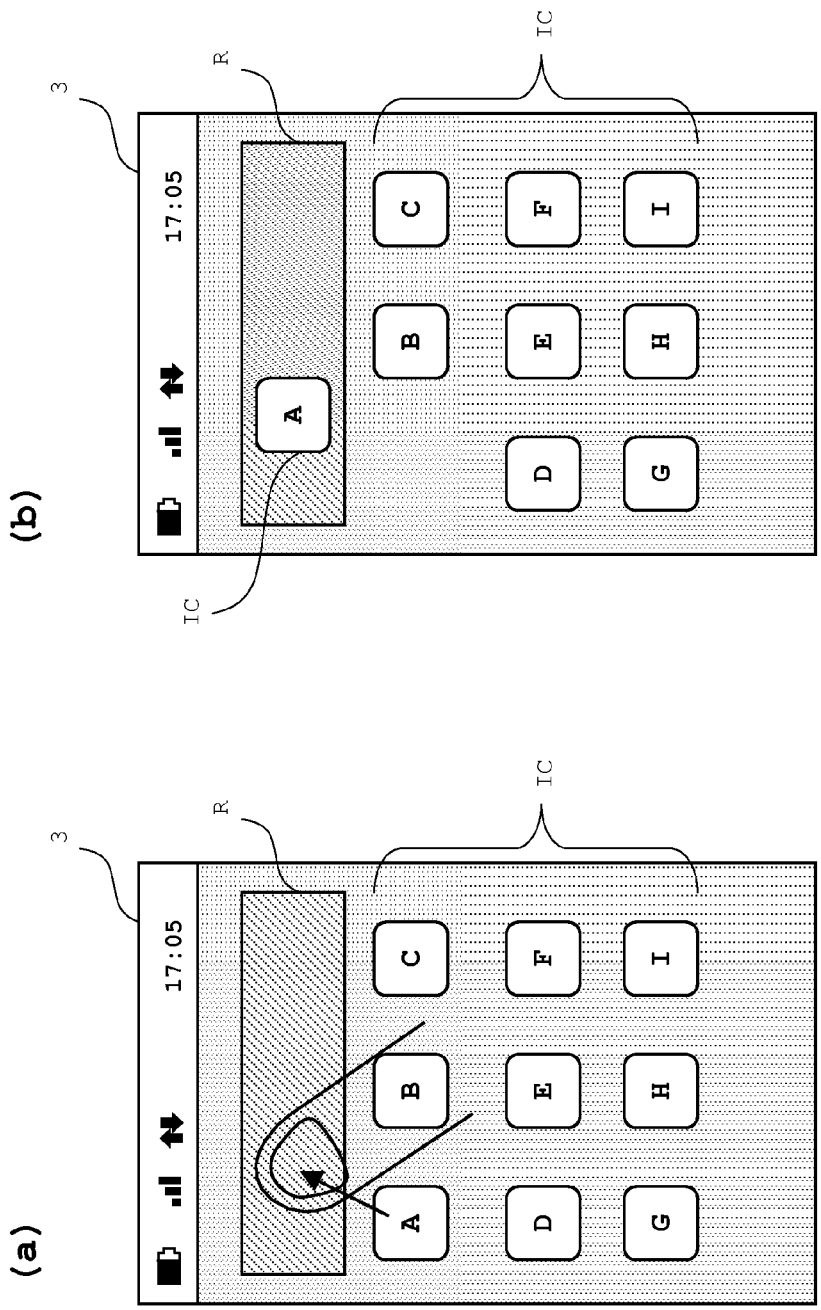
FIGS. 33A and 33B are diagrams showing an example of a screen for setting an application to be excluded by the user according to another modification of the second embodiment.

FIGS. 33A and 33B are diagrams showing an example of a screen, with which the user sets an application to be excluded.

As shown in FIG. 33A, an exclusion area R is formed in a partial area of a home screen, in which icons ICs for activating applications are arranged. As shown in FIG. 33B, in response to a user operation of moving an intended icon IC to the exclusion area R with his or her finger, the control module 11 moves the icon IC to the exclusion area R. As a result of the above operation, the control module 11 sets the application corresponding to the icon IC that has been moved to the exclusion area R, as an application to be excluded. The control module constantly maintains the communication mode of the application to be excluded to the non-restriction mode, and does not restrict background communication.

There is a case that a plurality of icons ICs corresponding to one application are disposed on the home screen by copying an icon IC. In this case, moving one of the icons ICs corresponding to the one application to the exclusion area R may also move the rest of the icons ICs other than the icon IC to the exclusion area R. Alternatively, the rest of the icons ICs may be erased. Further alternatively, the display state of the rest of the icons ICs may be changed such that a background area of the same color as the color of the exclusion area R is formed around the rest of the icons ICs. Further alternatively, the operation of the rest of the icons ICs may be invalidated so that the application is not activated by operation of the rest of the icons ICs.

Further, in the second example and in the fourth example, each of the time zones is set to a same duration of time. Alternatively, at least a part of the time zones may be set to a duration of time different from the duration of time of the other time zones.

Further, the invention may also be applied to a foldable mobile telephone. In this case, as partial restriction of background communication as described in the first modification of the first example, a communication process may be performed such that in the case where the mobile telephone is in an opened state when the background communication start timing has come, background communication is started, and in the case where the mobile telephone is in a closed state when the background communication start timing has come, background communication is stopped.

Further, the invention is not limited to access point search at the time of near-field communication. The invention may also be applied to search in a receiving stand-by state such as PTT (Push to Talk). In this example, a receiving stand-by state is a state of periodically searching whether a signal for starting PTT communication from other terminal has been received by a self terminal via a PTT server. In the case where the frequency of connection by PTT communication is low in the same time zone in the past as the current time zone or on the same day of the week in the past as the current day of the week in the receiving stand-by state, a search interval in the current time zone or on the current day of the week may be extended. The above configuration is advantageous in suppressing unnecessary electric power consumption in a stand-by state by PTT communication.

<Others>

The present invention is not limited to a mobile telephone, but may also be applied to various mobile terminal devices such as a PDA (Personal Digital Assistant), a tablet PC, an electronic book terminal, and the like.

The embodiments of the invention may be changed or modified in various ways as necessary, as far as such changes and modifications do not depart from the scope of the claims of the invention hereinafter defined.

REFERENCE SIGNS LIST

11 Control module
12 Storage module
19 Communication module
21 Determination module
22 Setting switching module
23 Period extending module
24 Exclusion setting module
25 Blocking control module
31 Determination module
32 Communication control module
33 Storage control module

The invention claimed is:

1. A mobile terminal device, comprising:
a communication module;
a control module configured to perform background communication with respect to an application via the communication module, wherein the control module restricts the background communication, based on an activation history of the application in foreground;
a first determination module configured to determine a frequency of activation of the application in foreground for a predetermined period in a past every predetermined cyclic period; and
a communication control module configured to restrict the background communication of the application for the predetermined period, whose frequency of activation in the past determined by the first determination module is lower than a predetermined frequency.

2. The mobile terminal device according to claim 1, wherein the control module includes:
    a second determination module configured to determine whether the background communication is unnecessary based on the activation history of the application in foreground with respect to each of the applications; and
    a setting switching module configured to switch communication setting of the application, of which background communication is determined to be unnecessary by the second determination module, from a first setting of permitting the background communication to a second setting of restricting the background communication.

3. The mobile terminal device according to claim 2, wherein the second determination module determines that the background communication of the application is unnecessary, in the case where the application has not been activated in foreground for a predetermined period or more.

4. The mobile terminal device according to claim 2, wherein the second determination module determines that the background communication of the application is unnecessary, in the case where the number of times of activation of the application in foreground for a predetermined period is smaller than a predetermined number of times.

5. The mobile terminal device according to claim 2, wherein the setting switching module switches communication setting of the application from the second setting to the first setting, in the case where the application whose communication setting is switched to the second setting based on a result of determination by the second determination module is activated in foreground.

6. The mobile terminal device according to claim 2, wherein the setting switching module switches communication setting of the application from the second setting to the first setting, in the case where the number of times of activation of the application in foreground, whose communication setting is switched to the second setting based on a result of determination by the second determination module, has reached a predetermined number of times.

7. The mobile terminal device according to claim 2, wherein the setting switching module switches communication setting of the application, whose communication setting is switched to the second setting based on a result of determination by the second determination module, from the second setting to the first setting, in the case where the mobile terminal device is in a charging period.

8. The mobile terminal device according to claim 1, wherein the first determination module determines a frequency of activation of the application in foreground on a certain day of a week in the past every day of the week, and the communication control module restricts the background communication of the application on the day, whose frequency of activation in the past determined by the determination module is lower than a predetermined frequency.

9. The mobile terminal device according to claim 1, wherein the communication control module is inoperative to perform the background communication, or lowers a frequency of the background communication.

10. The mobile terminal device according to claim 8, wherein the first determination module further determines whether a non-activation period when the application has not been activated in foreground exceeds a predetermined number of days;
    the communication control module lowers a frequency of the background communication, in the case where the frequency of activation in the past is lower than the predetermined frequency but the non-activation period does not exceed the predetermined number of days, or in the case where the frequency of activation in the past is not lower than the predetermined frequency but the non-activation period exceeds the predetermined number of days; and
    the communication control module is inoperative to perform the background communication, in the case where the frequency of activation in the past is lower than the predetermined frequency and the non-activation period exceeds the predetermined number of days.

11. The mobile terminal device according to claim 8, wherein the control module further includes a storage control module configured to cause a storage module to store the day when the application has been activated in foreground, and the storage control module is inoperative to cause the storage module to store the day when the application has been activated in foreground, in the case where an execution time of the application in foreground is shorter than a predetermined time.

12. A control method in a mobile terminal device configured to perform background communication with respect to an application, comprising:
    performing background communication with respect to an application via a communication module by a control module;
    referring to an activation history of the application in foreground by the control module;
    restricting the background communication based on the activation history by the control module;
    determining a frequency of activation of the application in foreground for a predetermined period in a past every predetermined cyclic period by a first determination module; and
    restricting the background communication of the application for the predetermined period by a communication control module, wherein the frequency of activation of the application in foreground for a predetermined period in the past is lower than a predetermined frequency.

* * * * *